(12) United States Patent
Farhat et al.

(10) Patent No.: US 7,792,745 B2
(45) Date of Patent: Sep. 7, 2010

(54) METHOD AND SYSTEM TO FACILITATE FINANCIAL SETTLEMENT OF SERVICE ACCESS TRANSACTIONS BETWEEN MULTIPLE PARTIES

(75) Inventors: Jay Farhat, Foster City, CA (US); Alla Rozenfeld, San Carlos, CA (US); Singam Sunder, San Jose, CA (US); Jeff Edgett, Sunnyvale, CA (US); Can Vu, Union City, CA (US)

(73) Assignee: iPass Inc., Redwood Shores, CA (US)

( * ) Notice: Subject to any disclaimer, the term of this patent is extended or adjusted under 35 U.S.C. 154(b) by 385 days.

(21) Appl. No.: 09/791,239

(22) Filed: Feb. 21, 2001

(65) Prior Publication Data

US 2001/0034704 A1    Oct. 25, 2001

Related U.S. Application Data

(60) Provisional application No. 60/185,180, filed on Feb. 25, 2000.

(51) Int. Cl.
G06Q 40/00    (2006.01)
(52) U.S. Cl. .......................................... 705/39; 705/30
(58) Field of Classification Search ................... 709/39, 709/400; 705/10–44
See application file for complete search history.

(56) References Cited

U.S. PATENT DOCUMENTS

| | | | |
|---|---|---|---|
| 5,027,388 A | 6/1991 | Bradshaw et al. | |
| 5,202,921 A | 4/1993 | Herzberg et al. | |
| 5,331,574 A | 7/1994 | Temoshenko et al. | |
| 5,412,723 A | 5/1995 | Canetti et al. | |
| 5,446,680 A | 8/1995 | Sekiya et al. | |
| 5,497,421 A | 3/1996 | Kaufman et al. | |
| 5,553,131 A | 9/1996 | Minervino, Jr. et al. | |
| 5,564,017 A | 10/1996 | Corn et al. | |
| 5,606,663 A | 2/1997 | Kadooka | |
| 5,611,048 A | 3/1997 | Jacobs et al. | |
| 5,638,514 A | 6/1997 | Yoshida et al. | |
| 5,726,883 A | 3/1998 | Levine et al. | |
| 5,757,784 A | 5/1998 | Liebowitz | |
| 5,768,521 A | 6/1998 | Dedrick | |

(Continued)

FOREIGN PATENT DOCUMENTS

JP    02033648    2/1990

(Continued)

OTHER PUBLICATIONS

International Search Report—PCT/US01/05152, May 9, 2001.

(Continued)

Primary Examiner—Frantzy Poinvil
(74) Attorney, Agent, or Firm—DeLizio Gilliam, PLLC

(57) ABSTRACT

A method to facilitate the financial settlement of service access transactions between multiple parties commences with the automatic collection of data concerning multiple transactions from respective service providers (e.g., ISPs). The multiple transactions are between the multiple service providers and multiple service customers. Respective transaction values are automatically determined for each of the multiple transactions. Account payable balances are automatically updated for the multiple service providers, and account receivable balances are automatically updated for the service customers based on the respective transaction values for each of the multiple transactions.

21 Claims, 26 Drawing Sheets

U.S. PATENT DOCUMENTS

| | | |
|---|---|---|
| 5,781,189 A | 7/1998 | Holleran et al. |
| 5,793,952 A | 8/1998 | Limsico |
| 5,802,502 A | 9/1998 | Gell et al. |
| 5,802,592 A | 9/1998 | Chess et al. |
| 5,815,665 A | 9/1998 | Teper et al. |
| 5,832,228 A | 11/1998 | Holden et al. |
| 5,845,267 A | 12/1998 | Ronen |
| 5,852,812 A * | 12/1998 | Reeder .......................... 709/39 |
| 5,889,774 A | 3/1999 | Mirashrafi et al. |
| 5,892,900 A | 4/1999 | Ginter et al. |
| 5,959,999 A | 9/1999 | An |
| 5,991,292 A | 11/1999 | Focsaneanu et al. |
| 6,023,470 A | 2/2000 | Lee et al. |
| 6,023,502 A | 2/2000 | Bouanaka et al. |
| 6,026,375 A | 2/2000 | Hall et al. |
| 6,028,917 A | 2/2000 | Creamer et al. |
| 6,029,143 A | 2/2000 | Mosher et al. |
| 6,032,132 A * | 2/2000 | Nelson .......................... 705/34 |
| 6,032,137 A | 2/2000 | Ballard |
| 6,035,281 A | 3/2000 | Crosskey et al. |
| 6,047,051 A | 4/2000 | Ginzboorg et al. |
| 6,049,671 A | 4/2000 | Slivka et al. |
| 6,055,503 A | 4/2000 | Horstmann |
| 6,070,070 A | 5/2000 | Ladue |
| 6,078,906 A * | 6/2000 | Huberman .................... 705/37 |
| 6,094,721 A | 7/2000 | Eldridge et al. |
| 6,112,239 A | 8/2000 | Kenner et al. |
| 6,125,354 A | 9/2000 | MacFarlane et al. |
| 6,128,601 A | 10/2000 | Van Horne et al. |
| 6,157,618 A | 12/2000 | Boss et al. |
| 6,167,126 A | 12/2000 | Janning |
| 6,173,171 B1 | 1/2001 | Plush et al. |
| 6,175,869 B1 | 1/2001 | Ahuja et al. |
| 6,188,994 B1 | 2/2001 | Egendorf |
| 6,189,096 B1 | 2/2001 | Haverty |
| 6,198,824 B1 | 3/2001 | Shambroom |
| 6,198,921 B1 | 3/2001 | Youssefzadeh et al. |
| 6,208,977 B1 | 3/2001 | Hernandez et al. |
| 6,212,280 B1 | 4/2001 | Howard, Jr. et al. |
| 6,212,561 B1 | 4/2001 | Sitaraman et al. |
| 6,216,117 B1 * | 4/2001 | Hall ............................ 705/400 |
| 6,219,790 B1 | 4/2001 | Lloyd et al. |
| 6,240,091 B1 | 5/2001 | Ginzboorg et al. |
| 6,260,142 B1 | 7/2001 | Thakkar et al. |
| 6,266,401 B1 | 7/2001 | Marchbanks et al. |
| 6,269,401 B1 | 7/2001 | Fletcher et al. |
| 6,282,274 B1 | 8/2001 | Jain et al. |
| 6,317,792 B1 | 11/2001 | Mundy et al. |
| 6,324,579 B1 | 11/2001 | Bleuse et al. |
| 6,327,707 B1 | 12/2001 | McKeeth et al. |
| 6,330,443 B1 | 12/2001 | Kirby |
| 6,332,075 B1 | 12/2001 | Verdonk |
| 6,405,028 B1 | 6/2002 | DePaola et al. |
| 6,459,779 B2 | 10/2002 | Wardin et al. |
| 6,463,275 B1 | 10/2002 | Deakin |
| 6,463,534 B1 | 10/2002 | Geiger et al. |
| 6,466,660 B1 | 10/2002 | Merriam |
| 6,473,740 B2 | 10/2002 | Cockrill et al. |
| 6,510,463 B1 | 1/2003 | Farhat et al. |
| 6,513,060 B1 | 1/2003 | Nixon et al. |
| 6,522,884 B2 | 2/2003 | Tennison et al. |
| 6,546,492 B1 | 4/2003 | Walker et al. |
| 6,549,770 B1 | 4/2003 | Marran |
| 6,553,218 B1 | 4/2003 | Boesjes |
| 6,577,858 B1 * | 6/2003 | Gell ............................ 455/407 |
| 6,578,075 B1 | 6/2003 | Nieminen et al. |
| 6,584,466 B1 | 6/2003 | Serbinis et al. |
| 6,628,775 B1 | 9/2003 | Van Tol |
| 6,640,242 B1 | 10/2003 | O'Neal et al. |
| 6,687,560 B2 | 2/2004 | Kiser et al. |
| 6,748,439 B1 | 6/2004 | Monachello et al. |
| 6,753,887 B2 | 6/2004 | Carolan et al. |
| 6,792,464 B2 | 9/2004 | Hendrick |
| 6,847,822 B1 | 1/2005 | Dennison et al. |
| 6,931,109 B1 | 8/2005 | Cook |
| 2001/0032197 A1 | 10/2001 | Chandra et al. |
| 2002/0029275 A1 | 3/2002 | Selgas et al. |
| 2002/0114346 A1 | 8/2002 | Lampe et al. |
| 2005/0021781 A1 | 1/2005 | Sunder et al. |
| 2005/0055371 A1 | 3/2005 | Sunder et al. |
| 2005/0197867 A1 | 9/2005 | Edgett et al. |
| 2006/0020525 A1 | 1/2006 | Borelli et al. |
| 2007/0220596 A1 | 9/2007 | Keeler et al. |
| 2008/0287094 A1 | 11/2008 | Keeler et al. |

FOREIGN PATENT DOCUMENTS

| | | |
|---|---|---|
| JP | 02039260 | 2/1990 |
| JP | 02112053 | 4/1990 |
| JP | 03189852 | 8/1991 |
| JP | 04054661 | 2/1992 |
| JP | 04067252 | 3/1992 |
| JP | 04084254 | 3/1992 |
| JP | 04142655 | 5/1992 |
| JP | 05189288 | 7/1993 |
| JP | 05199327 | 8/1993 |
| JP | 07182064 | 7/1995 |
| JP | 09265455 | 10/1997 |
| JP | 09330298 | 12/1997 |
| JP | 10289209 | 10/1998 |
| JP | 11203247 | 7/1999 |
| JP | 00112892 | 4/2000 |
| JP | 00165839 | 6/2000 |
| JP | 00194657 | 7/2000 |
| JP | 00259276 | 9/2000 |
| JP | 01053910 | 2/2001 |
| WO | WO-9615616 A3 | 5/1996 |
| WO | WO-9703410 A1 | 1/1997 |
| WO | WO9715885 | 5/1997 |
| WO | WO-9730543 A1 | 8/1997 |
| WO | WO-9903243 A1 | 1/1999 |
| WO | WO-9956254 A1 | 11/1999 |
| WO | WO0019297 | 4/2000 |
| WO | WO0062514 | 10/2000 |
| WO | WO-05081735 A2 | 9/2005 |

OTHER PUBLICATIONS

International Search Report—PCT/US01/05724, Jun. 8, 2001.

Kang, Paul H., "PCT Search Report".

"About Fiberlink" Published by Fiberlink Communications Corp. (2001) 1 pg.

"Broadmedia Introduces G-Phone DLX Phone (Product Annoucement)", *Tele-Service News*, 12(6) (Jun. 1, 2000) 2 pgs.

"Dial Up With Bay's New Remote Access Concentrator" *IT Times* (Oct. 21, 1997) p. 6.

"EarthLink Dials Up ClientLogic for Multi-Channel Technical Support" *Business Wire*, (Jul. 24, 2001) 2 pgs.

"IP Axess Adds Fixed-Wireless Service Provider to Participants in Its Expanding Evaluation Program" *Business Wire*, (Apr. 4, 2001) 2 pgs.

"Lucent Technologies Launches Next-Generation Voice Dialing Service for Wireless Networks. (Brief Article)" *Cambridge Telcom Report*, (Mar. 27, 2000), 2 pgs.

"Netopia Introduces First ADSL Routers to Offer Integrated Backup Module for "Fast Track" Deployment and Fully Redundant Internet Connectivity" *Business Wire* (May 24, 2000) 5 pgs.

"Trinagy's New Insight for Dial Access Solution Suite Delivers Proactive Management of Dial-Up Service Offerings", *Business Wire* (Apr. 24, 2001) 2 pgs.

"Ubrandit.com Adds Gigitel and Zodiac Cafe to Virtual ISP Client List" *Business Wire* (Oct. 16, 2000) 2 pgs.

Edwards, Morris, "It's a VPN thing—Technology Information" *Communications News* (Aug. 1, 1999), 4 pgs.

Schneier, Bruce, "In: Applied Cryptography: protocols, algorithms, and source code in C", New York: Wiley, 2nd Edition (1996), pp. 31-34, 52-56, 60, 75-79, 256, 480-481.

West, Wray, "Don't be nervous—remote access VPN's—Industry Trend or Event" *Communication News*, 37(5) (May 2000) pp. 28, 30, 32.

"U.S. Appl. No. 09/792,358, Response filed Oct. 8, 2008 to Non-Final Office Action mailed Jul. 10, 2008", 18 pgs.

"U.S. Appl. No. 09/792,358, Final Office Action mailed on Dec. 22, 2008", 11 pgs.

"U.S. Appl. No. 09/792,358, Non-Final Office Action mailed Jul. 10, 2008.", 10 pgs.

"U.S. Appl. No. 09/792,358, Response filed Mar. 31, 2008 to Final Office Action mailed Nov. 29, 2007", 15 pgs.

"U.S. Appl. No. 10/843,790 NFOA", Jun. 25, 2009, 17 pages.

"Companies mix and match VPN, dial-access,support", *InternetWeek ISSN-0746-8121* Jan. 25, 1999, n749 pVPN20.

"PCT/US01/41540 International Search Report", Nov. 16, 2001, 9 pgaes.

"PCT/US02/12343 International Preliminary Examination Report", Jul. 8, 2003, 8 pages.

"PCT/US02/12343 International Search Report", Sep. 19, 2002, 8 pages.

"PCT/US02/12470 International Search Report", Sep. 16, 2002, 8 pages.

"PCT/US02/12475 International Preliminary Examination Report", Jan. 16, 2003, 7 pages.

"PCT/US02/25996 International Search Report", Dec. 12, 2002, 4 pages.

Aboba, B. et al., "The Network Access Identifier", *RFC2486* Jan. 1999, 6 pages.

Blache, III, Fabian, "Spicing up the Web", *Greater Baton Rouge Business Report ISSN-074J-24652* Jul. 18, 2000, v18n23 pp. 94.

Blass, Steve, "Dr. Internet", *Network World* ISSN-0887-7661 Mar. 11, 2002, pp. 55.

Brockmann, Peter, "Rapport dialup switch redefines Internet service opportunities", *Telesis ISSN-0040-2710* Dec. 1996, n102 pp. 12-13.

Bruno, Lee, "Software & security. (Netegrity's Siteminder Enterprise Security software) (Product Information)", *Data Communications*, ISSN-0363-6399 Jan. 1997, 84(3) p.(d).

Clyde, Robert A., "Try a Step-by-Step Approach. (Data Security Measures)", *Computing Canada* Jan. 4, 1995, p. 42.

Greene, Tim, "Upstart VPN services staking out new ground", *Network World*, ISSN-0887-7661 Apr. 16, 2001, v18n16 pp. 30.

Guy, Sandra, "Untangling phone frustration, Bellcore solution offers a simpler way to do business", *Telephony ISSN-0040-2656* Jun. 2, 1997, 2 pages.

Johnson, Johna T., "Linking corporate users to the Internet", *Data Communications ISSN-0363-6399* Jan. 1993, v22n1 pp. 56-58.

Likier, Marty, "Using Dial-Up Technology for Internetworking Applications", *Telecommunications ISSN-0278-4831* May 1992, v26n5 DD.52,54.

Salamone, Salvatore, "Simplified Roaming, From POP to POP", *InternetWeek ISSN-1096-9969* Feb. 15, 1999, n752 pp. 11.

Sanders, Bob, "Despite nasty shake-out Local ISPs are thriving", *New Hampshire Business Review ISSN-0164-8152* Feb. 23, 2001, v23n4 pp. 1.

Scarcia, Costantino, "Getting on the Net With the Right ISP", *New Jersey Business*, ISSN-0028-5560 Sep. 1, 2000, v46n9 pp. 40.

Semich, J. W., "56K server supports U.S. Robotics and Lucent—Modems built into Model 800 from Bay Networks", *WebWeek*, 3(25) Aug. 18, 1997, v3 n26 p25.

Shen, Jin et al., "Research and implementation of proxy server", *Journal of Nanjing University of Aeronautics & Astronautics*, ISSN-1005-2615 Dec.2000, vol. 32 No. 6 pp. 620-624.

Silberg, Lurie, "Dialing the Web AT&T'S Internet Cellphone Debuts At Mass; Launches PocketNet wireless data service at retail in an attempt to bring cellphone with Internet access to the masses", *HFN-The Weekly Newspaper for the Home Furnishing Network* Oct. 13, 1997, pp. 93.

* cited by examiner

METHOD AND SYSTEM TO FACILITATE FINANCIAL SETTLEMENT OF SERVICE ACCESS TRANSACTIONS BETWEEN MULTIPLE PARTIES

CROSS REFERENCE TO RELATED APPLICATIONS

This application claims the benefit of U.S. Provisional Application No. 60/185,180, filed Feb. 25, 2000.

FIELD OF THE INVENTION

The present invention relates generally to the field of multi-party service access and, more specifically, to the brokering and settlement of service access transactions in a multi-party environment, involving multiple service providers and multiple service customers, such as a roaming service access environment.

BACKGROUND OF THE INVENTION

Due to the increasing globalization of economies, the need to provide communications between geographically dispersed persons and facilities has increased. For example, a particular business may have facilities located across multiple countries and continents. A further result of increased globalization has been an increase in business travel. The increasing dependence of corporations and persons on Internet-based communications has furthermore made it desirable that mobile workers (so-called "road warriors") be able to access Internet-based and wireless communications as they travel worldwide. Services that facilitate communications to such mobile persons are commonly referred to as "roaming services". Considering Internet-based communications as an example, in order to meet the needs of mobile customers, Internet Service Providers (ISPs) have begun to offer local-call access to the Internet from various locations world-wide, such a service being termed a "roaming" Internet access solution. The requirement for a roaming solution arises primarily because ISPs tend to specialize by geographic area, causing gaps in service coverage. The expansion of network infrastructure, network management and continuous upgrades to meet required reliability and performance standards all place tremendous capital and time burdens on ISPs. For these reason, many ISPs only locate Points of Presence (POPs) in a limited geographic area.

For the reasons set out above, the ability for ISPs to offer Internet roaming solutions, especially to business customers, is becoming increasingly important as many businesses utilize Internet-based communications to replace traditional remote access solutions for their telecommuters and mobile work forces.

In order to provide Internet roaming solutions, some ISPs have begun to share network infrastructure to gain additional geographic reach. This infrastructure sharing might take the form of an agreement to allow users of one ISP to gain Internet access through another ISP's network. FIG. 1 is a block diagram illustrating such a prior art arrangement whereby a first ISP 10, within a first geographic area 12, facilitates access to a network via a POP 14 to a roaming user 16. The roaming user 16 is a subscriber to a second ISP 18, but through an agreement between the ISPs 10 and 18 obtains service access through the POP 14.

The bilateral agreement between the ISPs 10 and 18 illustrated in FIG. 1 may require building user names and passwords into authentication databases for both the ISPs 10 and 18. Alternatively, an authorization server 20 of the ISP 10 may, upon receiving an access request to the POP 14 from the roaming user 16, initiate a direct authorization procedure with an authorization server 22 of the ISP 18. Both options involve a complex technical implementation in order for one provider to "buy" a small amount of service access time through another provider. The management of such relationships may also be difficult and cost ineffective. For example, consider that the roaming user 16 will pay the ISP 18 for the service access facilitated by the ISP 10. The ISP 18 then is shown to make a payment to the ISP 10.

To summarize, a number of problems are encountered when ISPs attempt to share network infrastructure. Firstly, the creation of a secure authentication scheme over a public access network may be difficult. Secondly, managing accounting information and sharing costs may be complex. Thirdly, providing sufficient scalability may be challenging. These problems become exasperated as ISPs attempt to provide global coverage, requiring that a particular ISP enter into relationships with a large number of other ISPs. This arrangement does not scale well, and the complexity of managing these relationships significantly increase each time a new partnership is established.

SUMMARY OF THE INVENTION

The present invention provides a method to facilitate financial settlement of service access transactions between multiple parties. Data concerning a plurality of transactions is automatically collected from respective service providers of a plurality of service providers, the plurality of transactions being between the plurality of service providers and a plurality of service customers to facilitate service access by the plurality of service customers. A respective transaction values are automatically determined for each of the plurality of transactions. Account payable balances for a plurality of service providers and account receivable balances for the plurality of service customers and service users are automatically updated based on the respective transaction values for each of the plurality of transactions.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to facilitate financial settlement of service access transactions between multiple parties are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "service access transaction" should be taken to include a transaction between a service customer and a service provider for access to a service. An example of such a service may be access to any communications network via any medium or protocol. For example, the communications networks may comprise packet-switched networks, circuit-switched networks, cable networks, satellite networks, terrestrial networks, wired networks, or wireless networks. The term "service access transaction", however, is not limited to a network access transaction, and encompasses a transaction pertaining to access to any one of a number of other services such as content, commerce and communications services.

For the purposes of the present specification, the term "customer" shall be taken to include any entity involved in the purchase and/or consumption of service access, regardless of whether the service access is performed by the customer or not. For example, a "customer" may be an end-user consumer that actually utilizes the service access, or a corporate entity to which such an end-user belongs, an Internet service provider, an Internet carrier, a reseller, or a channel.

Overview

Figure 1:
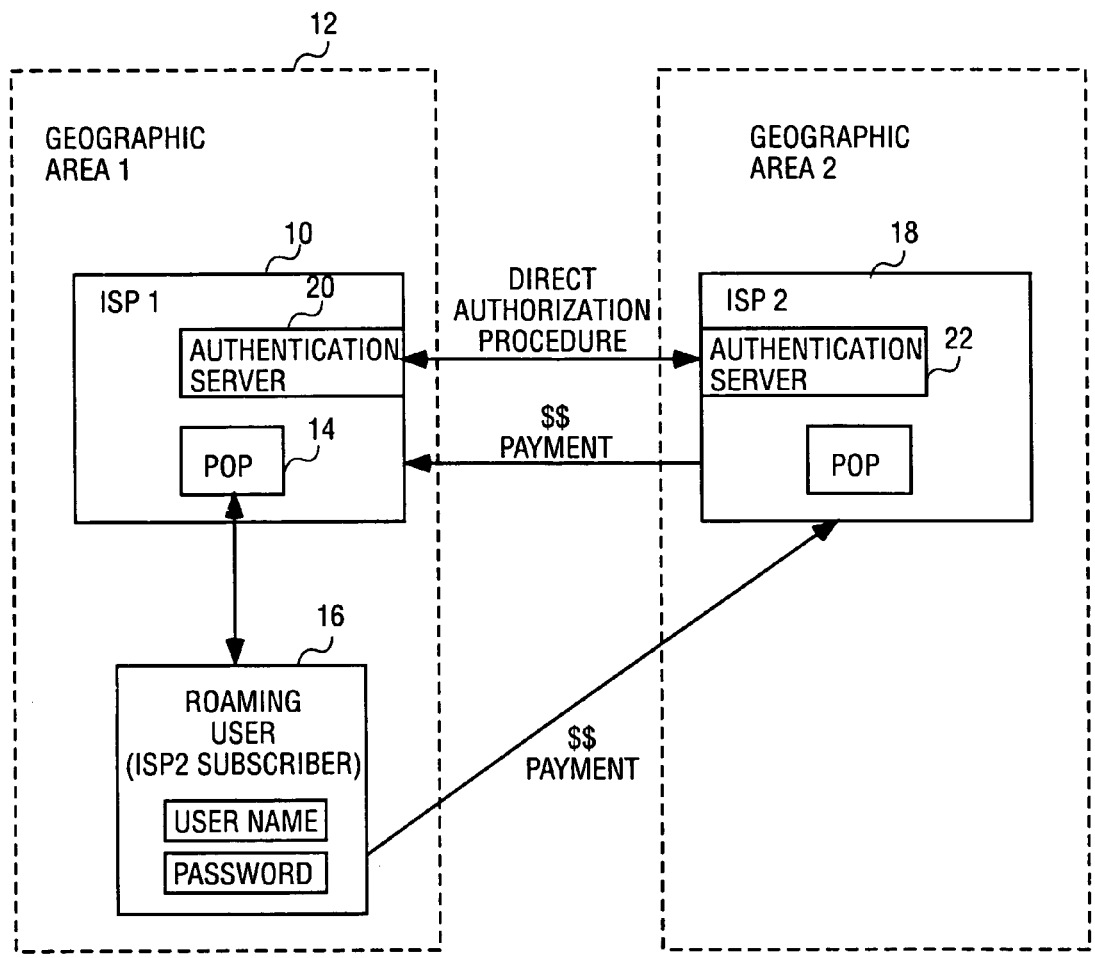
FIG. 1 is a block diagram illustrating a prior art method for service providers to exchange authentication, usage and accounting information.

The present invention discloses a third-party access broker and settlement system for service access (e.g., Internet access, content access, commerce access, or communications access) services that enable a service provider (e.g., an ISP, a wireless service provider, a VPN service provider, a content distribution service provider, an e-commerce service provider or an application service provider) to offer provider independent service access to multiple services in a geographically dispersed manner. One embodiment of the present invention provides a method for service providers to exchange authentication, usage and accounting information in a secure, standardized manner without the need to establish multiple bilateral relationships with other service providers, as described above with reference to FIG. 1. The present invention also provides a "clearing house" function to facilitate the settlement of service usages between service providers and to process billing information in a manner compatible with the existing billing mechanisms of service providers.

Figure 2:
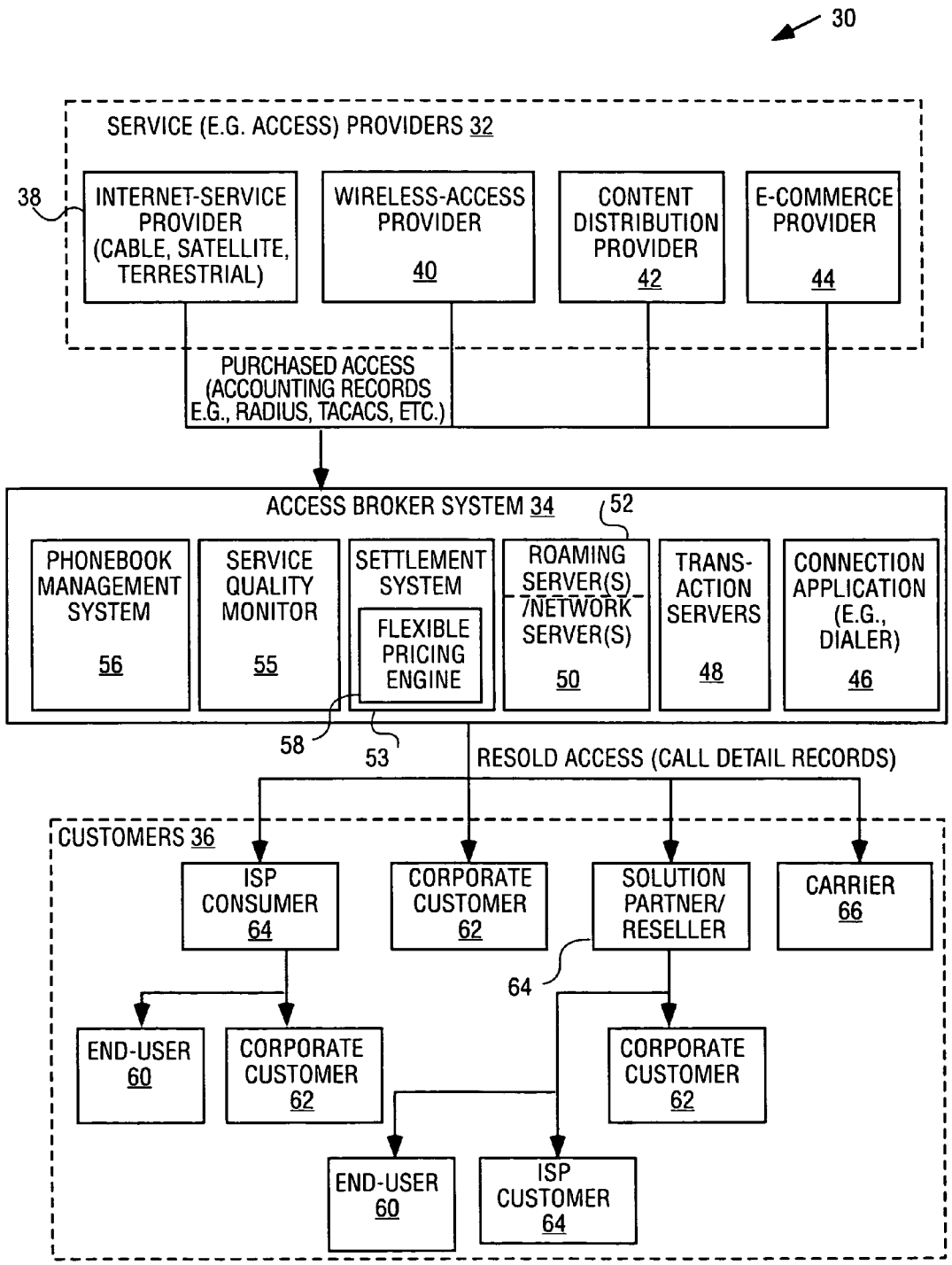
FIG. 2 is a block diagram of a multi-party service access environment, according to an exemplary embodiment of the present invention, that includes a number of service providers, an access broker system and multiple customers.

FIG. 2 is a block diagram of an exemplary multi-party service access environment 30, in the exemplary form of a network access environment, that includes a number of service providers 32, an access broker system 34, according to an exemplary embodiment of the present invention, and multiple customers (or consumers) 36. At a high level, the service providers 32 have service (e.g., access, content, e-commerce services etc.) capacity that is sold, via the access broker system 34, to the multiple customers 36. Accordingly, the access broker system 34 may be regarded as purchasing service capacity (e.g., service access), which is then resold to the customers 36. While the service to which access is provided below is network access, it will be appreciated that access is described below as an exemplary service. In the exemplary embodiment, the service providers 32 may include any communication network service providers, such as ISPs 38 (e.g., UUNet Technologies, Genuity, CompuServe Network Services, EQUANT, Hong Kong Telecom, etc.), wireless access providers 40 (e.g., Verizon, Sprint, Pacific Bell), content distribution providers 42 and e-commerce providers 44. The service providers 32 may, however, include any number or type of service providers providing any number of services (e.g., access, content, communications or e-commerce services, to name but a few).

The access broker system 34, according to an exemplary embodiment of the present invention, is shown to include a number of components. A connection application 46 is a client application, typically installed on a service access device (e.g., a computer system) of a customer 36 that facilitates convenient access to a communications network. In one embodiment, the connection application 46 comprises a dialer that provides a simple point-and-click interface for dialing into a worldwide connection network of the access broker system 34. To this end, the connection application 46 may store multiple phone numbers for multiple ISPs worldwide with potentially different setup and dial-up scripting information.

Transaction servers 48 provide trusted third-party functionality of routing and logging user identification information, authorization responses and usage and accounting information, as will be described in detail below.

Network servers 50 are installed on a "remote" ISP allowing its POPs to be utilized by roaming users. Roaming servers 52 reside at a "home" ISP to allow users access to a roaming network. It should be noted that the transaction servers 48 operate to route messages between the network and roaming servers 50 and 52.

A settlement system 53, according to an exemplary embodiment of the present invention, performs financial settlement of service access transactions between the service providers 32 and the customers 36.

The access broker system 34 is also shown to include Service Quality Monitor 55 (SQM) that facilitates the collection and analysis of quality of service (QoS) information for services provided to customers 36 and a phonebook management system 56 that facilitates management of multiple connection applications 46 utilized by customers 36.

The settlement system 53, the SQM 55 and the phonebook management system 56 interface directly with central settlement database.

The network and roaming servers 50 and 52 do not interface with the central settlement database. The transaction servers 48 are accessed by the settlement system 53 to load transaction data. Functioning of the settlement system 53, and an included flexible pricing engine 58, are described in detail below. The settlement system 53 may be viewed as including the following high-level components:

1. Settlement back-end applications;
2. Settlement front-end applications;
3. Data aggregation and reporting applications; and
4. System interfaces.

Turning now to the customers 36, FIG. 2 illustrates a multi-tier customer structure, whereby the access broker system 34 may interact with customers 36 operating according to a variety of business plans and needs. At one end of the spectrum, a customer 36 may comprise an individual end-user that subscribes to a roaming system facilitated via the access broker system 34. Alternatively, a customer 36 in the form of a corporate customer (e.g., a corporation or business) 62 may operate as a customer of the access broker system 34 to purchase roaming Internet access for employees of the corporation.

A customer 36 may also comprise an ISP customer 64 that purchases roaming Internet access for resale to its customers (e.g., end-users 60 and corporate customers 62). A customer 36 may also operate as a solution partner or reseller 64 that markets and resells roaming Internet access brokered by the access broker system 34 to end-users 60, corporate customers 62 or ISP customers 64.

The customers 36 may also include parties regarded as Internet Carriers 66 (e.g., IXCs, RBOs, CLECs, ILECs and ISPs). It will be appreciated that any of the entities comprising the customers 36, as discussed above, may operate to purchase service access from the access broker system 34 either for use or resale.

Roaming Service Access

Figure 3:
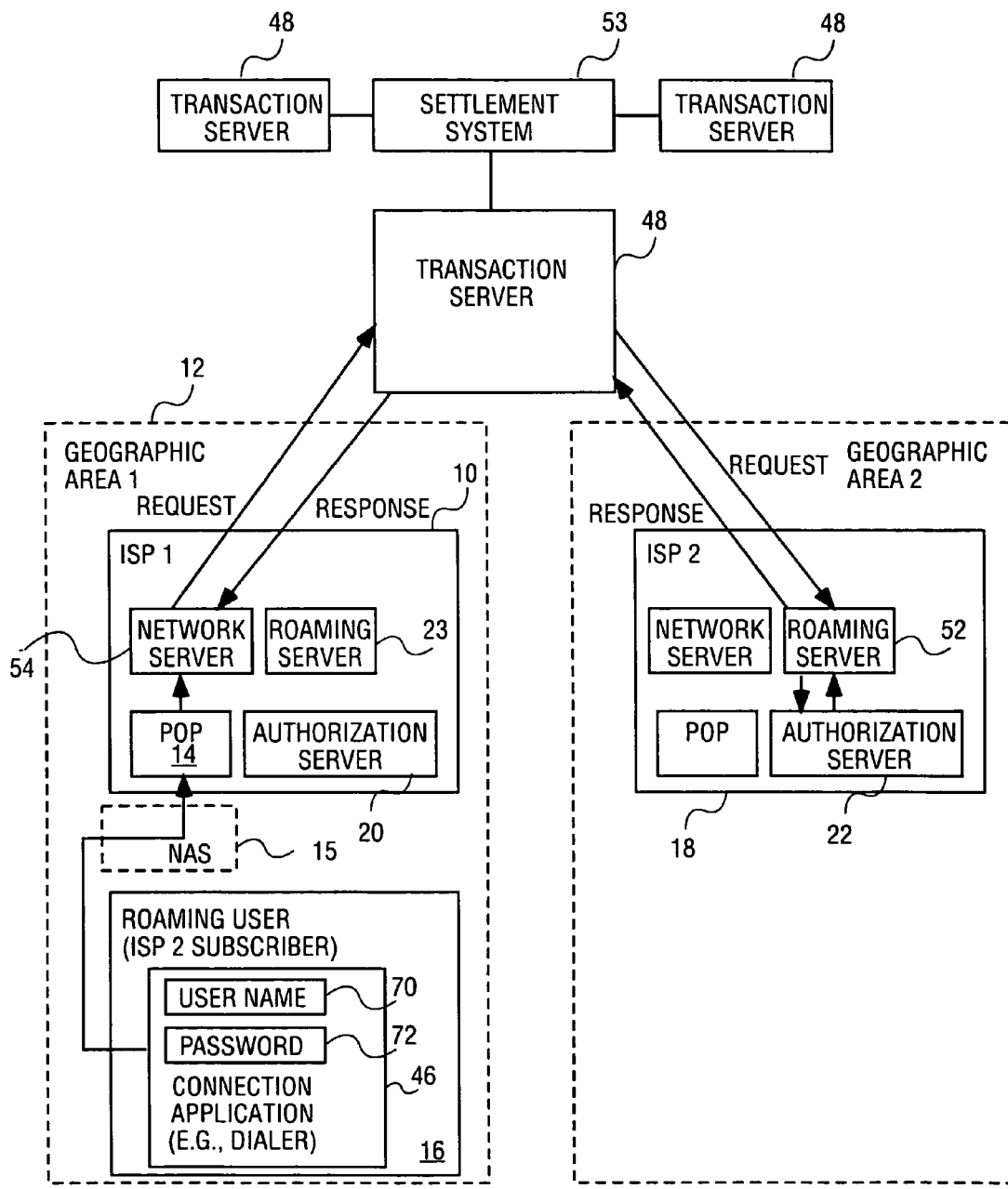
FIGS. 3 and 4 are block diagrams illustrating operation of an access broker system to provide roaming Internet access, according to an exemplary embodiment of the present invention.
Figure 4:
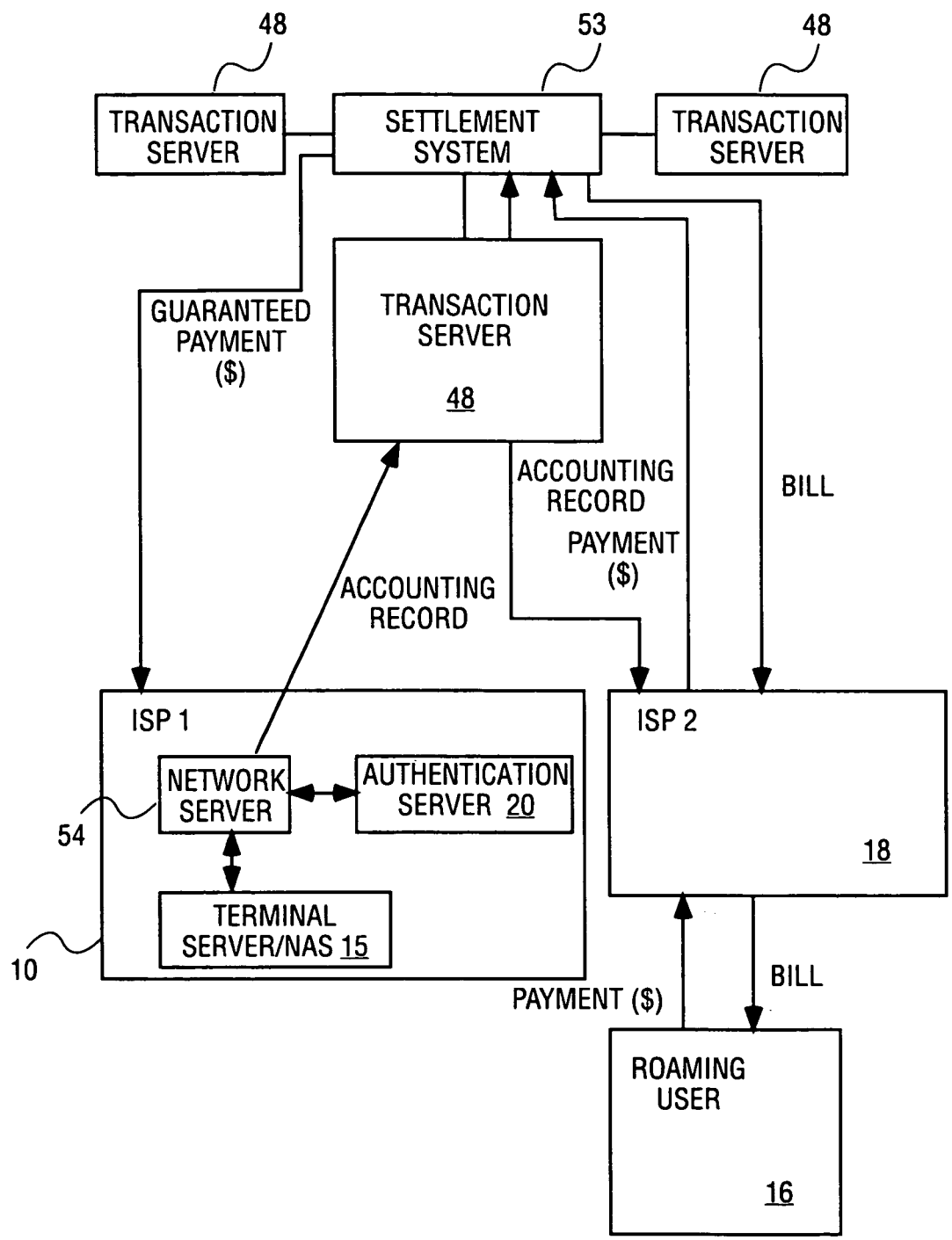

FIGS. 3 and 4 are block diagrams illustrating how the access broker system 34 operates to provide roaming Internet access, according to one embodiment of the present invention. This example is provided merely by way of illustration, and it will be appreciated that the settlement system 53 described in more detail below is not limited to Internet access, but may be applied to the settlement of any service (e.g., network, content, or e-commerce service) access transactions.

Referring specifically to FIG. 3, when the roaming user 16, shown to be a subscriber to a "home" ISP 18, connects to a remote ISP 10 that provides a local POP 14 within a specific geographic area 12, the roaming user 16 inputs the same user name 70 and password 72 (i.e., authentication information) used when connecting via a POP of the "home" ISP 18. A slight modification to the regular user name 70 identifies the roaming user as "visiting" and thus requiring remote authentication.

This authentication information is collected by a terminal server or a network authorization server (NAS) 15 and is sent to an authorization server 20 of the remote ISP 10. In the normal course of operations, a network authorization server (NAS) 15 at the remote ISP 10 would reject the supplied authentication information. However, as illustrated in FIG. 3, the network server 54 intercepts the authentication information to facilitate recognition of this authentication information as a roaming user authentication request.

The authorization server 20, in conjunction with the network server 54, parses the received authentication information to determine a roaming domain name and prefix associated with the roaming user. Should such a domain name or prefix be present, the user's authentication information is encrypted using an algorithm from RSA Data Securities, and sent from the network server 54 to a transaction server 48 via secure socket layer (SSL).

The transaction server 48 performs an Internet Protocol (IP) look-up and routes the authentication request to an appropriate home ISP 18. More specifically, the transaction server 48 receives an encrypted authentication request from the network server 54 at the remote ISP 10, and decrypts this request. The transaction server 48 then determines the "home" ISP 18 by matching the roaming domain name of the desired home ISP 18 against a current list of participant domain names and IP addresses. If the match is successful, the authentication request is encrypted and sent via SSL to a roaming server 52 that resides at the home ISP 18. In the event that the identified roaming server 52 does not respond within a specific period, the transaction server 48 will attempt to contact an alternative roaming server 52 at the ISP of the relevant domain.

The roaming server 52 at the "home" ISP 18 then decrypts the authentication request sent from the transaction server 48, and submits the authentication request to the "home" ISP's regular authorization server 22 as if it were a terminal server or NAS 15 owned by the home ISP 18. The "home" ISP 18 authorization server 22 responds to the request by providing an "access permitted" or an "access denied" response based on the validity of the user name and password included within the authentication request. The response from the authorization server 22 is received by the roaming server 52, encrypted, and sent back to the transaction server 48.

The transaction server 48 receives the encrypted response, identifies the remote ISP 10, encrypts the response, and returns the authorization message to the remote ISP 10.

FIG. 4 is a block diagram illustrating the accounting and settlement procedures, according to an exemplary embodiment of the present invention, which may be facilitated by the access broker system 34.

When a roaming user 16 connects and disconnects from remote ISP 10, the terminal server (or NAS) 15 managing the session generates the accounting information and sends this information to the authorization server 20. The authorization server 20, in conjunction with the network server 54, parses the accounting information to determine a roaming domain name and prefix associated with the roaming user. Should such a domain name or prefix be present, the user's accounting information is encrypted using an algorithm from RSA Data Securities, and sent from the network server 54 to a transaction server 48 via secure socket layer (SSL). The network server 54 ensures the accounting records are generated for the roaming user 16.

An accounting record is then communicated, in near real-time, to the transaction server 48 utilizing SSL, where the accounting records are stored in the database. These accounting records are further processed by the settlement system 53 to produce Call Detail Records (CDRs). Each call detail record provides detailed usage reporting regarding the identity of the roaming user 16, when the relevant service access occurred, the location of the service access, the length and cost of each service access session, and the time of the service access (e.g., local or GMT time).

Multiple transaction servers 48 provide accounting records to the settlement system 53, which utilizes these records to generate bills (or invoices) to customers 36, and also to make payments to service providers 32.

In summary, the settlement system 53 generates bills and distributes them among customers 36 so that they can make payments to the settlement system 53, and in turn bill their customers if appropriate. Similarly, the settlement system 53 makes payments to the remote (or visitor) ISPs or other service providers 32 for accrued access time used by roaming users. The settlement system 53 may further guarantee payment for authorized use by a roaming user. An operator of the settlement system 53 thus acts as a secure, trusted entity providing a mechanism for facilitating financial settlement of service access transactions between multiple parties. The settlement system 53 implements numerous automatic functions and operations so as to enable the settlement in a timely, automated and convenient manner. Further details regarding the operation of the settlement system to facilitate such settlement or service access transactions will be described in detail below.

Physical Architecture

Figure 5:
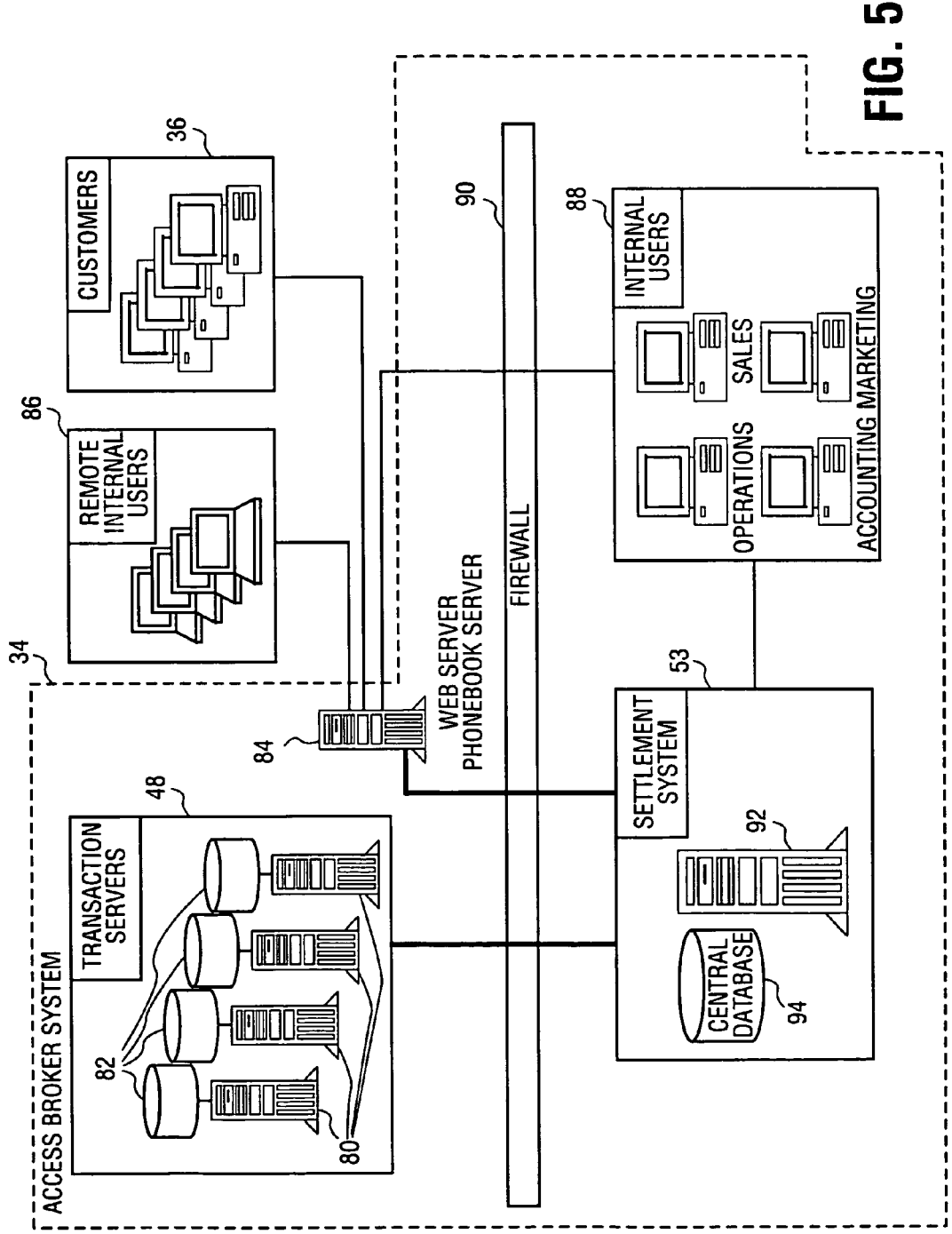
FIG. 5 is a diagrammatic representation of the physical architecture of an access broker system, according to an exemplary embodiment of the present invention.

FIG. 5 is a diagrammatic representation of the physical architecture of an access broker system 34, according to an exemplary embodiment of the present invention. Multiple transaction servers 48 are shown to reside on one or more server machines 80, each of which has access to an associated database 82. A web server and phonebook server reside on a server machine 84, and are accessible by remote internal users 86 and customers 36. The web server operates to generate and deliver web pages (e.g., HTML documents) to both the remote internal users 86 and the customers 36, examples of such web pages being provided below. The phonebook server (part of the phonebook management system 56) operates to maintain and update the electronic phonebooks of customers 36, and accordingly both receives and publishes updates to and from service providers 32, and publishes such updates to customers 36.

The settlement system 53, and a collection of internal users 88 are shown to reside behind a firewall 90. Specifically, the settlement system 53 is hosted on one or more server machines 92 that have access to a central database 94.

Overview—Settlement System

Figure 6A:
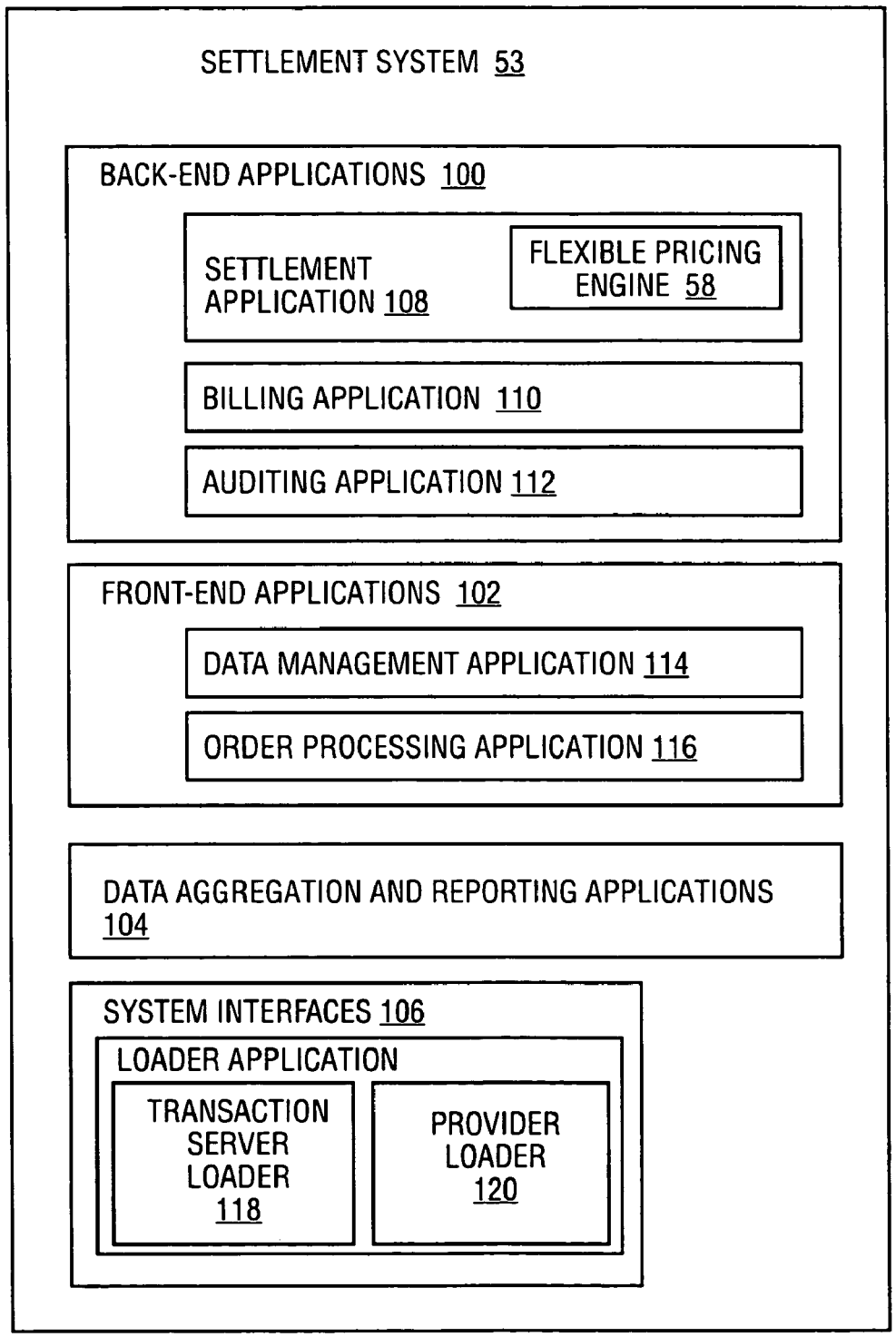
FIG. 6A is a block diagram illustrating an architecture of a settlement system, according to an exemplary embodiment of the present invention.

FIG. 6A is a block diagram illustrating the architecture of a settlement system 53, according to an exemplary embodiment of the present invention. As discussed above, the settlement system 53 comprises back-end applications 100, front-end applications 102, data aggregation and reporting applications 104 and system interfaces 106.

The back-end (or server-side) applications 100 are shown to include a settlement application 108 that determines a transaction price, updates account balances for all parties involved in a transaction, and verifies credit limits, a billing application 110 that closes an accounting cycle, applies periodical fees, generates billing reports, including invoices and call detail records (CDRs), and publishes billing reports to the web, and an auditing application 112 that verifies business rules and structural integrity of the central database 94. The settlement application 108 is shown to embody the flexible pricing engine 58.

The settlement application 108 is responsible for normalization, summarization and verification functions. The normalization function includes converting accounting data received from multiple transaction servers 48 into a single format CDR to be used for billing, identifying parties involved in a service access transaction, and defining the price that the access broker system 34 owes to a provider 32 and the price that a customer 36 owes to the access broker system 34 for a particular service access transaction.

The summarization function involves applying buy and sell prices to account balances for all parties involved in a service access transaction, and updating appropriate account balances. The verification function includes the verification of credit limits.

The settlement system 53 operates to provide near real-time settlement of service access transactions to allow for the near real-time revenue and account tracking by both providers 32 and customers 36.

As mentioned above, the settlement system 53 includes the flexible pricing engine 58 that supports a flexible pricing model, which has the following features:

1. A variety of data structures dependent on, for example, the customer 36, the service provider 32, the location of the service access, the type of service access (e.g., dialup modem, ISDN, DSL), or usage accumulated during a particular cycle for a particular customer 36.
2. Any combination of (a) usage (e.g., a function of rate and session length); (b) transactional (per transaction); and (c) subscription-based or flat pricing (e.g., one price for all usage during a billing cycle for a customer 36 or one or more prices per each user for a customer during a billing cycle).
3. Offered discounts and promotions.
4. A variety of fees, such as start-up fees, monthly fees and minimum monthly commitments.
5. Multi-tiered pricing schemes, or intra-provider roaming, where buy and sell rates for a particular location depend on the provider 32 and whether the service user/customer 36 of the service access belongs to a further customer 36, its affiliate, or their customer.

The flexible pricing engine 58 is database-driven, thus allowing implementation of new pricing models by loading the appropriate plan into pricing tables (not shown) maintained within the central database 94.

More specifically, the flexible pricing engine 58 facilitates a multi-tiered pricing model, whereby rates for a single service access transaction may be applied across multiple tiers of consumer (or customer) according to multiple criteria. These criteria may include, inter alia, any combination of usage (e.g., accumulated usage time or value total) pricing and transactional (e.g., an accumulated total number of transactions) pricing.

Figure 6B:
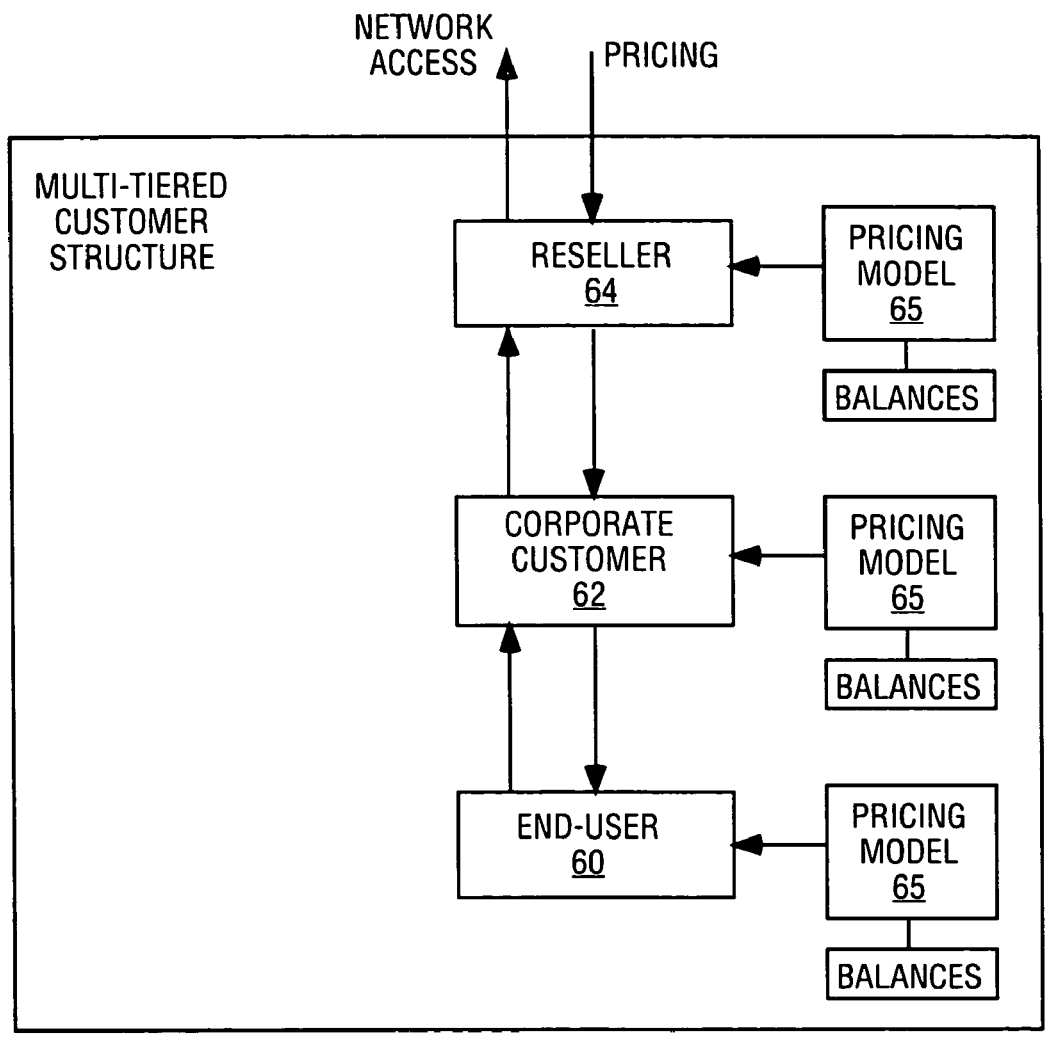
FIG. 6B is a block diagram illustrating an exemplary multi-tiered customer structure.

FIG. 6B is a diagrammatic representation of a multi-tier customer structure, whereby a reseller 64 sells service access to a corporate customer 62 then in turn facilitates service access by an end user 60. It will be appreciated that the exemplary multi-tiered customer structure is purely exemplary, and any combination and arrangement of customer structure may be accommodated by the flexible pricing model. In the example, the end user 60 is shown to be provided with service access through the corporate customer 62 and through the reseller 64, with pricing for that service access being percolated down through the tiers of the consumer structure. Specifically, for each customer in such a multi-tiered customer structure, a separate and distinct pricing model 65 may be defined and applied to determine pricing for a single service access involving the relevant customer. Merely for example, a single service access by the end-user 60 may have pricing implications for both the corporate customer 62 and the reseller 64, and the flexible pricing engine 58, according to an exemplary embodiment of the present invention, allows an appropriate record for that single service access to be generated for each of the consumers in the multi-tiered consumer structure according to criteria and specifications unique to each such customer.

Exemplary criteria that may be embodied within a pricing model 65 applicable to a particular consumer may be any combination of usage and transaction pricing. For example, when an accumulated usage or transaction total for a particular reseller 64, which may provide access to any number of further levels of customer, reaches a predetermined threshold, the pricing applied for service access may change. Specifically, volume discounts based on usage or transaction totals may apply. In this way, a customer on a particular tier of a multi-tiered customer structure may obtain the benefit of service accesses by customers below the relevant customer, and obtain favorable pricing based on, for example, volumes of service access usage or service access transactions that the reseller customer purchases from the access broker system 34.

Similarly, usage and transaction totals may be maintained for the corporate customer 62 for accesses to the network by all end users 60 (e.g., employees) associated with the corporate customer 62, so as to enable the corporate customer 62 to obtain pricing benefits associated with the amount of service access usage, and a number of service access transactions, by employees of the relevant corporate consumer 62.

Other pricing criteria that may be included within a pricing model 65 applicable to a specific customer include:

1. The identity of the entity actually performing the service access (e.g., a service access by a particular corporation may be priced at a specific rate);
2. The network location being accessed;
3. The time of day at which the service access occurs;
4. The day of the week at which the service access occurs;
5. Discounts and promotions applicable to the particular consumer;
6. Type of service access;
7. Type of service; and/or
8. Various customer and end-user fees and commitments.

A respective pricing model 65 may also specify certain subscription, or flat rate pricing to be applied to an appropriate customer.

In summary, by providing a multi-tiered, flexible pricing model, the pricing engine 58 allows a single service access transaction, by any customer within a multi-tiered customer structure, to be reflected in the account balances for multiple customers according to a dedicated pricing model 65 for each of those respective customers.

Returning now to FIG. 6A and the front-end applications 102, a data management application 114 is utilized by various functional units of the access broker to perform business processes and to view data for information purposes. To this end, data management application 114 may provide various user interfaces to manage information related to customers 36 and access points, and to perform accounting and administrative functions.

An order processing application 116 provides user interfaces to customers 36 (e.g., solution partners 64 or resellers) to place orders for new corporate customers.

The data aggregation and reporting applications 104 include several processes that summarize data on a daily or monthly basis to enable operational, functional and network load reporting.

The system interfaces 106 have a loader application that includes a transaction server loader 118, a provider loader 120 and accounting system interfaces (not shown). Dealing first with the transaction server loader 118, a "data loader" component pulls accounting records from the databases 82 of the respective transaction servers 48 to the central database 94 for processing. Multiple transaction server loaders 118 may be implemented as distributed database links, and the accounting records are pulled via the loaders 118 in near real-time.

A provider loader 120 receives call detail records (CDRs) from providers 32 in a batch form. This CDR data is preprocessed by a provider loader 120, which may retrieve the data from an appropriate FTP site and convert it into the same format as the data received from the transaction servers 48.

Overview—Data Model

Figure 7:
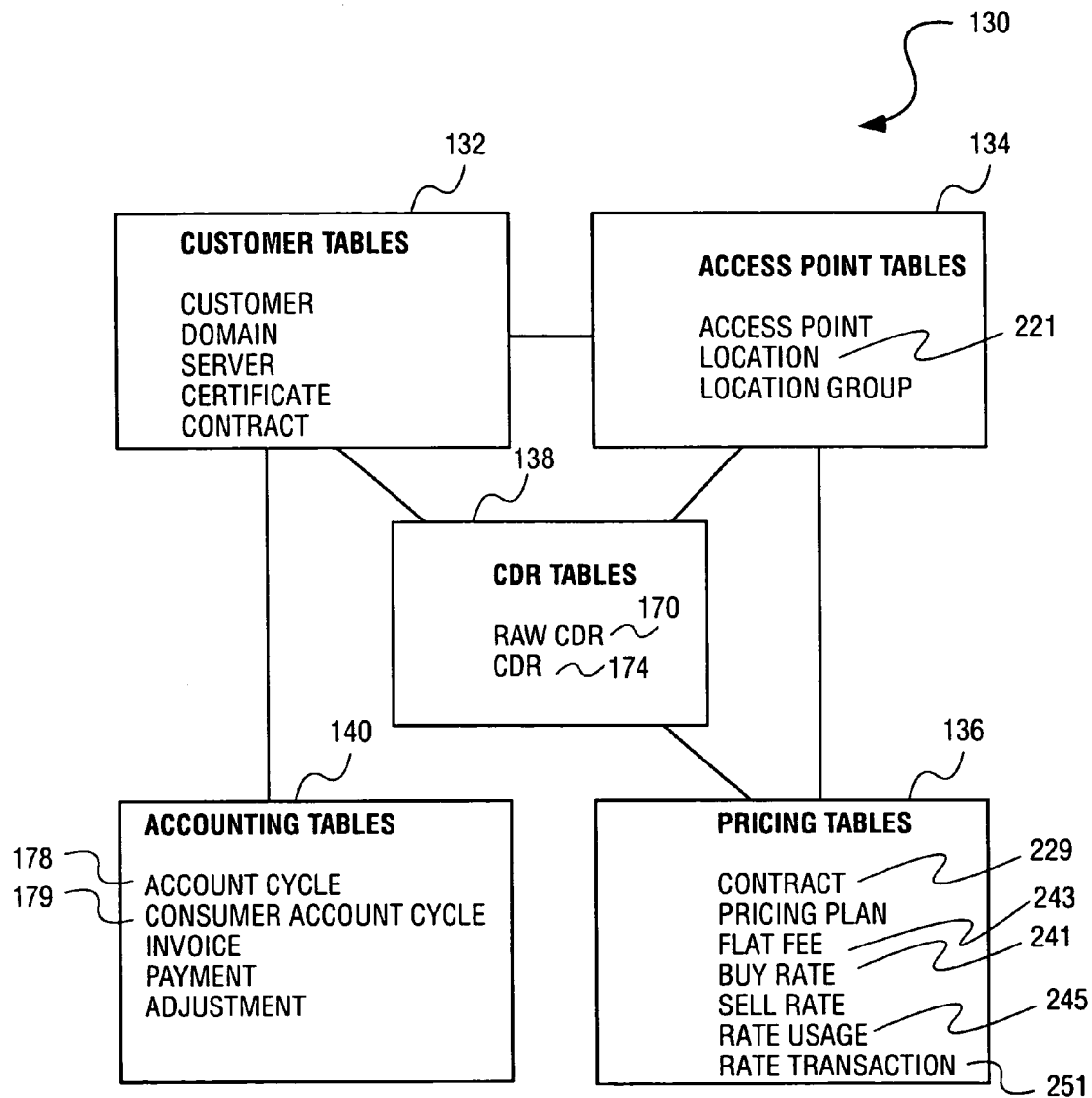
FIG. 7 is a block diagram illustrating a data model, according to an exemplary embodiment of the present invention.

FIG. 7 is a block diagram illustrating an exemplary data model including customer tables 132, access point tables 134, pricing tables 136, CDR tables 138 and accounting tables 140. Further details regarding these exemplary tables will be provided below.

Overview—Processes

Figure 8:
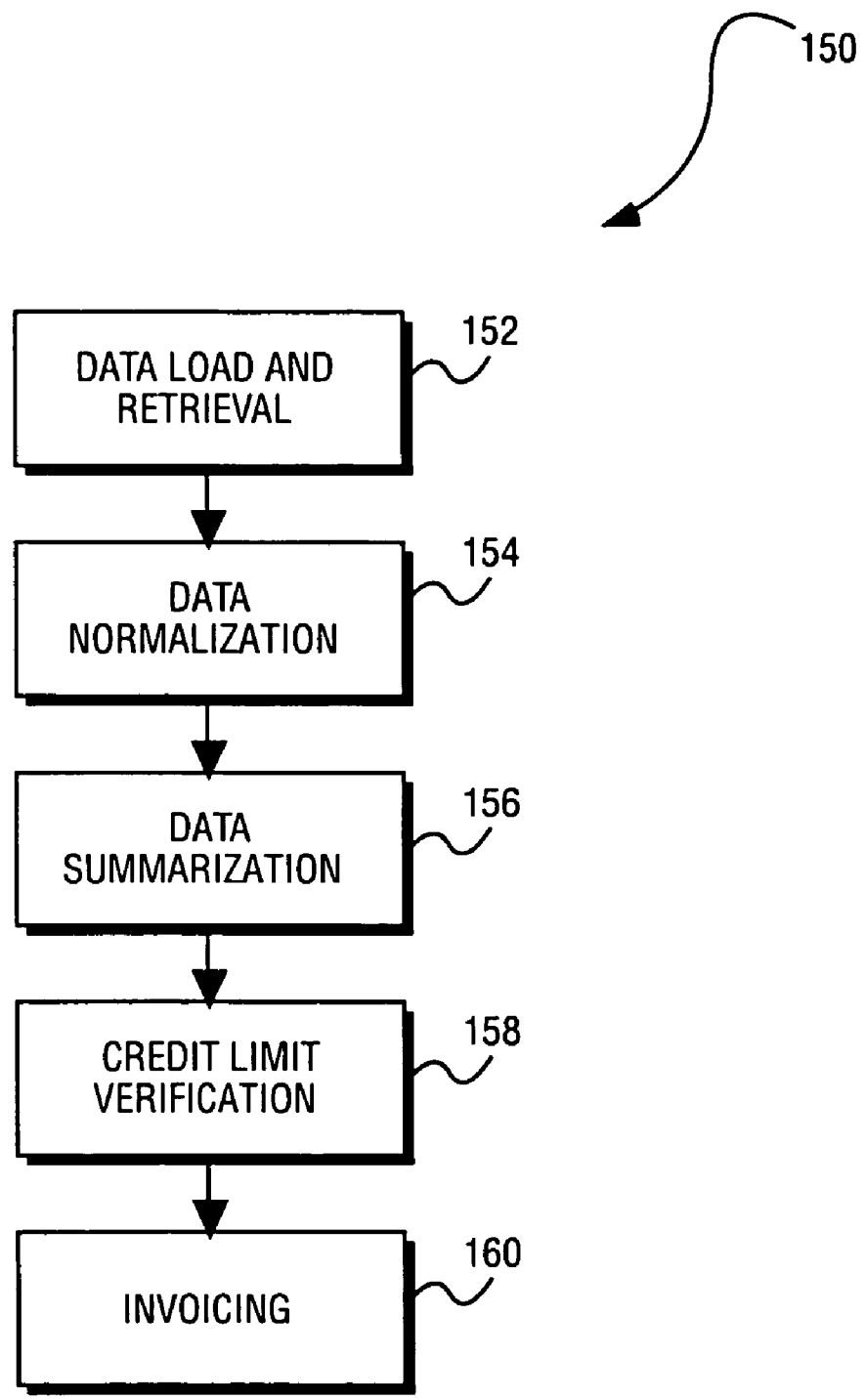
FIG. 8 is a flow chart providing a high-level view of a method, according to an exemplary embodiment of the present invention, of facilitating a financial settlement of service access transactions between multiple parties.

FIG. 8 is a flow chart providing a high-level view of a method 150, according to an exemplary embodiment of the present invention, of facilitating financial settlement of service access transactions between multiple parties. The method 150 commences at block 152 with a data load and retrieval operation, followed by a data normalization operation at block 154. A data summarization operation is performed at block 156. Various credit limits are verified at block 158, whereafter invoicing of customers 36 is performed at block 160. Further details regarding each of the operations described above with reference to blocks 152-160 shall be provided below.

Figure 9:
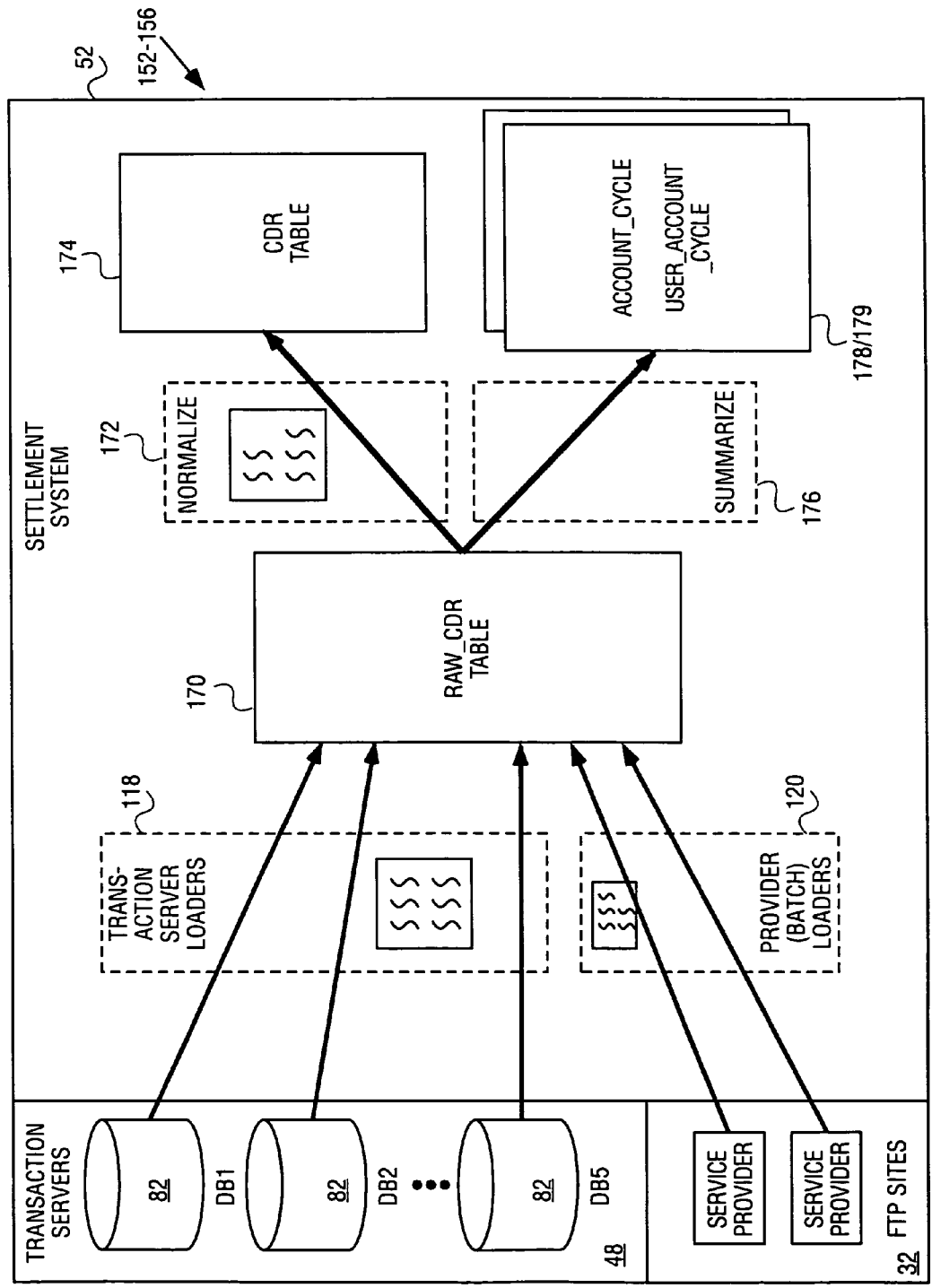
FIG. 9 is a diagrammatic representation of data load, normalization and summarization operations, according to an exemplary embodiment of the present invention.

FIG. 9 is a diagrammatic representation of the data load and retrieve operation indicated at block 152 in FIG. 8, the data normalization operation indicated at block 154 and the data summarization operation indicated at block 156. Specifically, dedicated transaction server loaders 118, in the exemplary form of loader threads, are shown to retrieve raw call detail (or accounting) records (CDRs) from each of the respective databases 82 maintained by the transaction servers 48, and to include such records within a raw call detail records (CDR) table 170. Similarly, dedicated provider loaders 120, in the exemplary form of loader threads, retrieve raw call detail records (CDRs) from one or more service providers 32 in batch form for inclusion within the raw CDR table 170.

A normalization process 172 then converts the raw call detail records retrieved from the raw CDR table 170 into normalized call detail records to be stored in a CDR table 174, while a summarization process 176 summarizes the normalized call detail records into summarized records for storage in an account cycle table 178 and a user account cycle table 179.

It should be noted that the load, normalization and summarization operations are performed in near real-time, which is facilitated by multithreaded processes. Specifically, each thread makes a connection to an appropriate database 82. Accordingly, the transaction server loaders 118, the provider loaders 120, and normalization process 172 are shown to include multiple threads to provide the near real-time capabilities.

Methodology—Load, Normalization and Summarization

Figure 10:
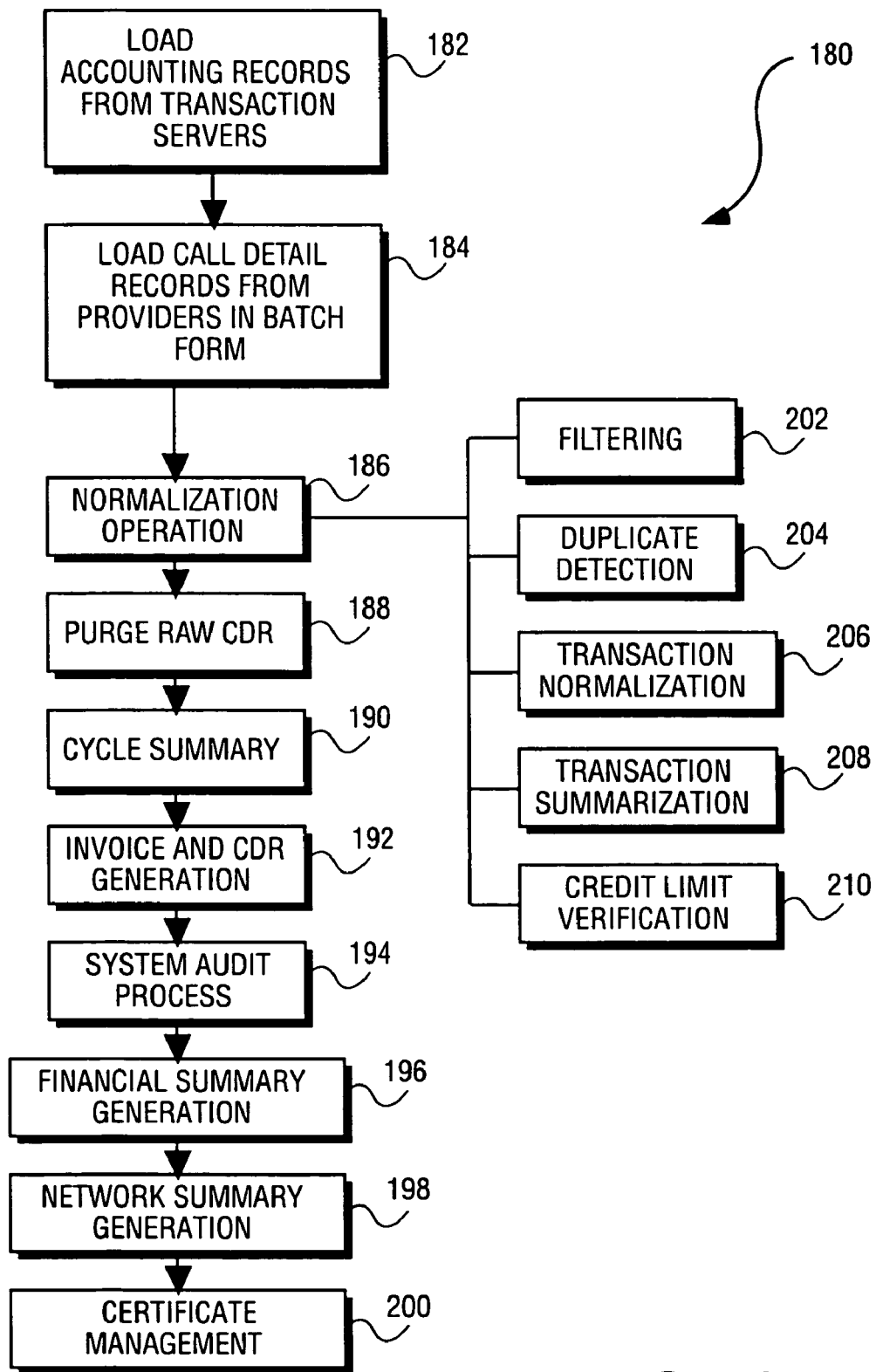
FIG. 10 is a flow chart illustrating a method, according to an exemplary embodiment of the present invention, of loading, normalizing and summarizing service access transaction data for service access transactions between multiple parties.

FIG. 10 is a flow chart illustrating a method 180, according to an exemplary embodiment of the present invention, of loading, normalizing and summarizing service access transaction data for service access transactions between multiple parties. The method 180 is performed, at least in part, by the settlement application 108 of the settlement system 53, illustrated in FIG. 6.

The method 180 commences with the loading of accounting records from the respective databases 82 of the transaction servers 48, in the manner described above. Specifically, each server 48 may, in one embodiment, generate three types of records for each roaming user session, namely: (1) an authentication record; (2) a session start accounting record; and (3) a session end accounting record. In one embodiment, only the session end accounting record is retrieved via the transaction server loaders 118, and utilized by the settlement system 53, as such records contain all required information concerning the duration of a particular service access session.

At block 184, the provider loaders 120 similarly retrieve call detail records from relevant service providers 32. The provider loaders 120 load and pre-process call detail records received from the providers 32, including decrypting such records, parsing and loading the records into appropriate tables, and converting the records into a standard format for inclusion within the raw CDR table 170.

A normalization operation is performed at block 186 by a normalization process 172, as illustrated in FIG. 9. The normalization operation includes a number of functions, which will now be individually described.

At block 202, a filtering process eliminates call detail records that are considered to be invalid from further processing and billing. For example, the following call detail records may be considered invalid:
1. Records indicating a session time that exceed a predetermined maximum (e.g., 100 hours);
2. Call records that indicate a specified session ID indicating the record was not as a result of a process of interest (e.g., an administrative session);
3. A call record where the domain name of the record is not of interest (e.g., where domain name indicates that the NOC probed the network);
4. Call records that indicate a negative session time (e.g., as a result of faulty network authorization servers); and
5. Call records that indicate a common customer and provider.

At block 204, a duplicate detection function identifies duplicate accounting records, and eliminates them from further processing. Such duplicate records may be included within the raw CDR table 170 as network authorization servers (NAS's) 15 may resend accounting records if the response from a destination is not received within a predetermined time interval.

At block 206, a transaction normalization function is performed, followed by a transaction summarization function at block 208. Further details regarding the transaction normalization and transaction summarization functions are described below with reference to FIGS. 11-13.

At block 210, a credit limit verification function retrieves credit limit and credit limit threshold information for a given customer from the central database 94, verifies customer account balances against the credit limit and credit threshold information, and sends an e-mail to an accounting contact if the credit limit or credit threshold is exceeded.

Figure 11:
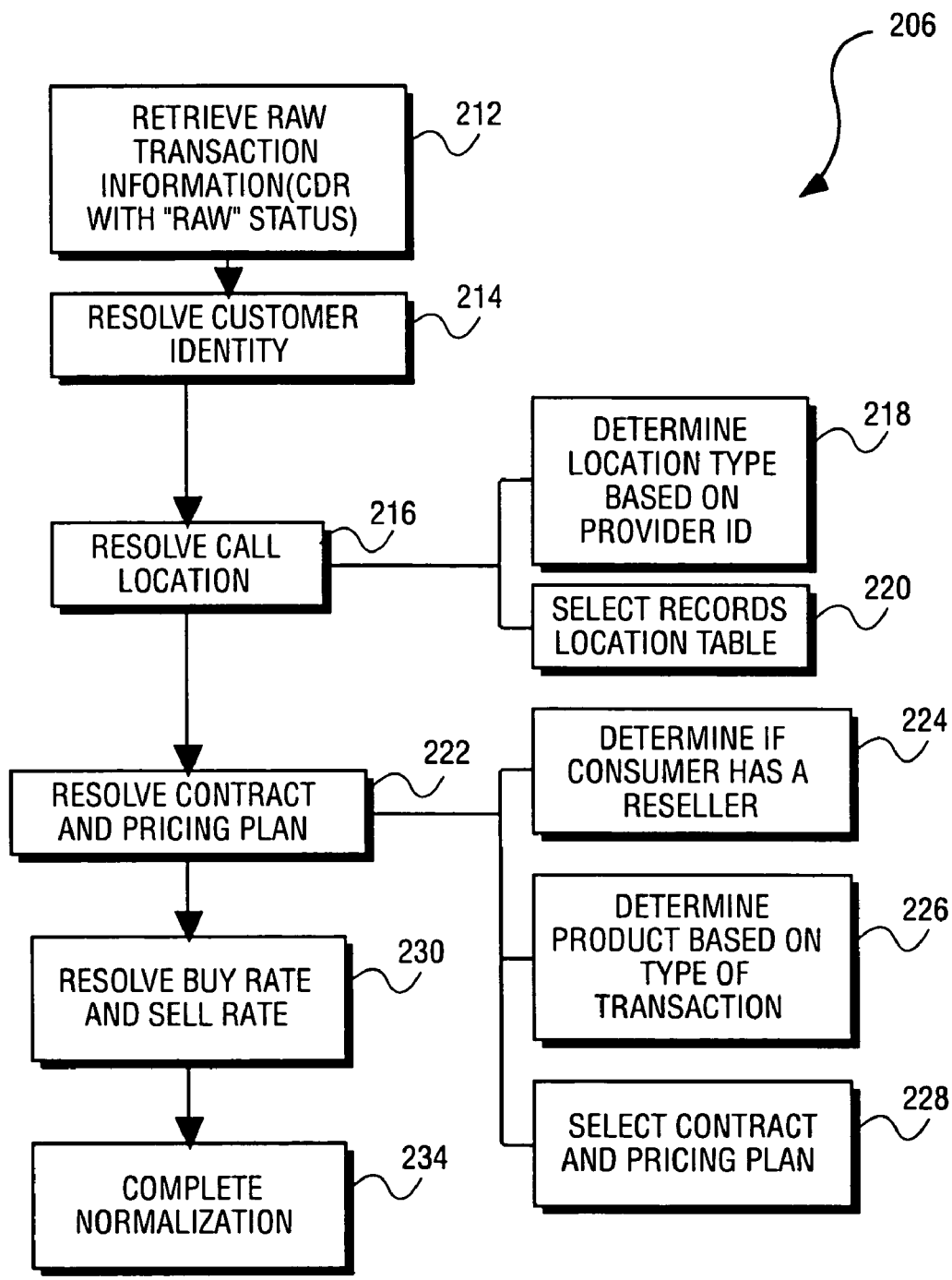
FIG. 11 is a flow chart illustrating a method, according to an exemplary embodiment of the present invention, of normalizing service access transaction data.

Returning to the transaction normalization at block 206, FIG. 11 is a flow chart illustrating a method 206, according to an exemplary embodiment of the present invention, of normalizing service access transaction data. The method 206 is performed by the normalization process 172. At block 212, raw transaction information (e.g., CDR records that are flagged as having "raw" status within the raw CDR table) 170 is retrieved.

At block 214, the relevant customer identity for a specific call detail record is resolved. Specifically, a stored procedure "resolve_customer" parses user login string to extract a domain name. The domain name may then be validated against a "customer_domain" table, which results in a "customer_id". If a domain cannot be resolved, an exception is generated.

At block 216, the call location is resolved. Call locations are represented in accounting records in a variety of ways, and specific business rules are defined to determine the location type for a given call detail record. Specifically, the resolution of the call location, at block 218, may determine a location type based on a provider identifier that identifies which field in a call detail record contains a location value. At block 220, records are selected from a "location" table 221 based on a provider identifier, location type and location value, and the location identifier and location group identifier are determined.

At block 222, a contract and pricing plan are resolved. Specifically, this involves the three operations indicated at blocks 224-228. At block 224, a determination is made as to whether a specific customer has a reseller (or parent), for which the service access is purchased. At block 226, product is determined based on the type of transaction (e.g., for example, roaming, telephony, e-commerce). At block 228, a contract and pricing plan are selected from a "contract" table 229 based on a customer identifier, a location identifier, a reseller identifier (if any) and a product identifier.

At block 230, a buy rate and a sell rate are resolved. Further details regarding this operation are described below with respect to FIG. 12.

At block 234, the normalization is completed. Specifically, the normalization process 172 stores the results of the process in the normalized call detail records (CDR) table 174. The status of a call detail record within the raw CDR table 170 may be changed to "normalized", billing event records may be included within a "billing event" table (not shown), one billing event record being for the relevant customer 36 and the other being for the relevant provider 32. The normalized call detail record is then stored in the CDR table 174.

Figure 12:
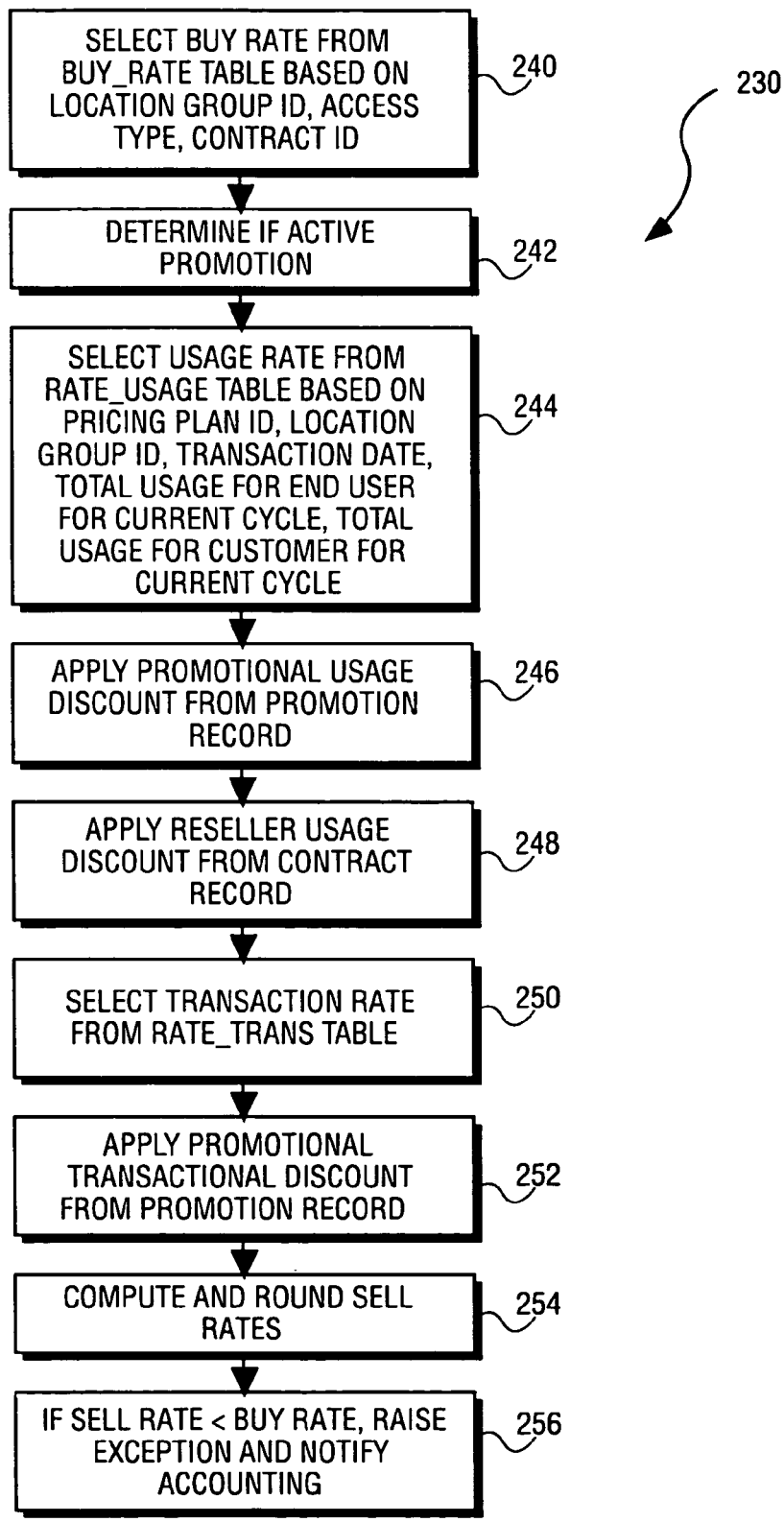
FIG. 12 is a flow chart illustrating a method, according to an exemplary embodiment of the present invention, of resolving buy and sell rates for a service access transaction.

Further details regarding the resolution of the buy and sell rates at block 230 will now be described. FIG. 12 is a flow chart illustrating an exemplary method 230 of resolving buy and sell rates for a service access transaction. At block 240, a buy rate is selected from a buy_rate table 241 of the pricing tables 136, shown in FIG. 7, based on a location group identifier, access type (e.g., modem, ISDN, DSL, toll free etc.) and contract identifier.

At block 242, a determination is made as to whether there is an active promotion for a given contract identifier.

At block 244, a usage rate is selected from a rate usage table 245 of the pricing tables 136 based on a pricing plan identifier, a location group identifier, a transaction date and total usage for a customer (e.g., an end-user, corporation or reseller) for a current accounting cycle. The total usage parameter may, in one embodiment, only be used where usage-based rating conditions are included within a rate.

At block 246, a promotional usage discount, from a promotion record, is applied if it is determined at block 242 that a promotion is active.

At block 248, a reseller usage discount may be applied from a contract record, if the customer is determined to be a customer of a reseller to which such a discount is provided.

At block 250, a transaction rate is determined from a rate transaction table 251 of the pricing tables 136 utilizing the same criteria that were utilized at block 244 to select the usage rate.

At block 252, a promotion transaction discount is applied from the promotion record, where it is determined at block 242 that there is active promotion.

Accordingly, from blocks 244-252, a usage rate, less a usage discount and a transaction rate, less a transaction discount are determined. At block 254, a sell rate may be computed by adding the discounted usage and transaction rates, whereafter the computed sell rate may be rounded to the nearest cent.

At block 256, if it is determined that the sell rate is less than the buy rate, an exception may be raised and accounting may be notified.

It should furthermore be noted that the selections of the usage and transactional rates at blocks 244 and 250 include verification of the following conditions:

1. A transaction date is checked against rate start/end dates and day week;
2. A transaction time is checked against the rate start/end times of a particular day; and
3. Usage limits (start/end) are checked against respective usage counters in user account and account cycles incremented with the transaction duration for the end of user level conditions. The level of a user limit condition is specified in a rate record contained within the rate usage and rate transaction tables of the pricing tables 136. If a transaction causes the accumulated usage to exceed a specified usage limit, two sets of rates may be applied (e.g., the record may be reported as two call detail records in a call detail record report).

In one exemplary embodiment, a rate stored and a rate record of the rate usage or rate transaction table may include three components, namely:

1. A fixed rate, that is the fixed amount paid for a service access session;
2. A scaled rate that is a usage-based rate; and
3. A free quantity that is an amount of time that is not included in the usage charges for each service access transaction. A rate (either a usage or transaction rate) may be calculated as:

$$rate = fixed\ rate + scaled\ rate * (session\ duration - free\ quantity).$$

Figure 13A:
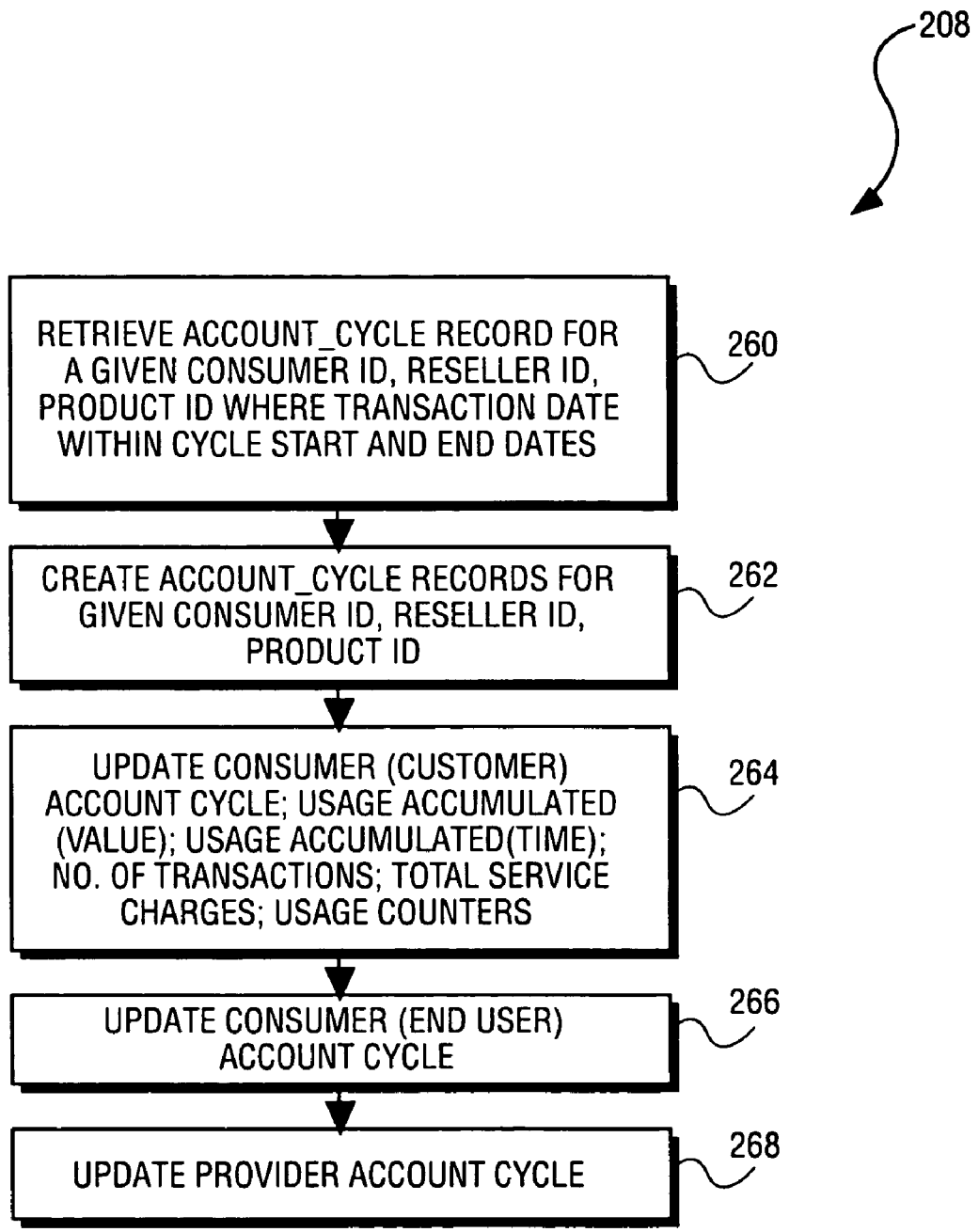
FIG. 13A is a flow chart illustrating a method, according to an exemplary embodiment of the present invention, of summarizing service access transaction information.

Further details shall now be provided regarding the transaction summarization operation of block 208, shown in FIG. 10. FIG. 13A is a flow chart illustrating a method 208, according to an exemplary embodiment of the present invention, of summarizing service access transaction information. At block 260, an account cycle record is obtained from account cycle table 178 of the accounting tables 140 for a given customer (or location) identifier and product identifier, where a transaction date is within cycle start and end dates. If an account_cycle record does not exist for a given customer identifier, reseller identifier and product identifier, such a record is then created within the account cycle table 178 at block 262.

At block 264, a customer account cycle record within the customer account cycle table 179 is updated by incrementing the following account cycle balances maintained within an appropriate record:

1. Usage accumulated/value;
2. Usage accumulated/time;
3. Number of transactions;
4. Total service charges; and
5. Usage counters to support customer level usage-based pricing conditions.

An account balance is further calculated utilizing a formula based on a value of several balances from a customer account cycle. The account balance is recalculated every time an account cycle record is updated.

At block 266, an end-user customer transaction is updated by incrementing usage accumulated/value, usage accumulated/time and user counters that support end-user customer level usage pricing conditions.

At block 268, a provider account cycle is updated by incrementing usage provided/value and usage provided/time balances, and by decrementing a current services charge balance and an account balance.

It should furthermore be noted that, for different customer types (e.g., resellers, ISPs, consumers and end-users), different balance types may be maintained to support a pricing model 65 applicable to the particular consumer. Examples of such balances for a corporate consumer 62 and an end-user are listed below:

Exemplary Corporate Consumer Balances usage used value
usage used time
number of transactions
transactional value
usage provided value
usage provided time
startup fees
cycle fees
user cycle fees
user cycle flat fees
commitment penalty
credit (multiple balances by type)
service charges
previous balance
account balance
payment payables
payment receivables
usage counter 1
usage counter 2

Exemplary End-user Balances usage used value
usage used time
number of transactions
transactional value
usage counter 1
usage counter 2

Returning to the method 180 illustrated in FIG. 10, following the normalization operation at block 186, records from the raw CDR table 170 that are older than a predetermined time period (e.g., two hours) and which have a status of "normalized", "filtered", "duplicate" or "exception" are deleted to prune raw CDR table 170.

At block 190, a cycle summary (or cycle close) is run at the end of a predetermined time period (e.g., daily, weekly or monthly). Specifically, the billing application 110 supports customer specific billing schedules, which facilitates the billing of different customers on different dates. A specified customer cycle close time and/or day may be stored in a customer_billing_information table (not shown). A cycle close summarizes customer and user account cycle and closes customer account cycle.

Figure 13B:
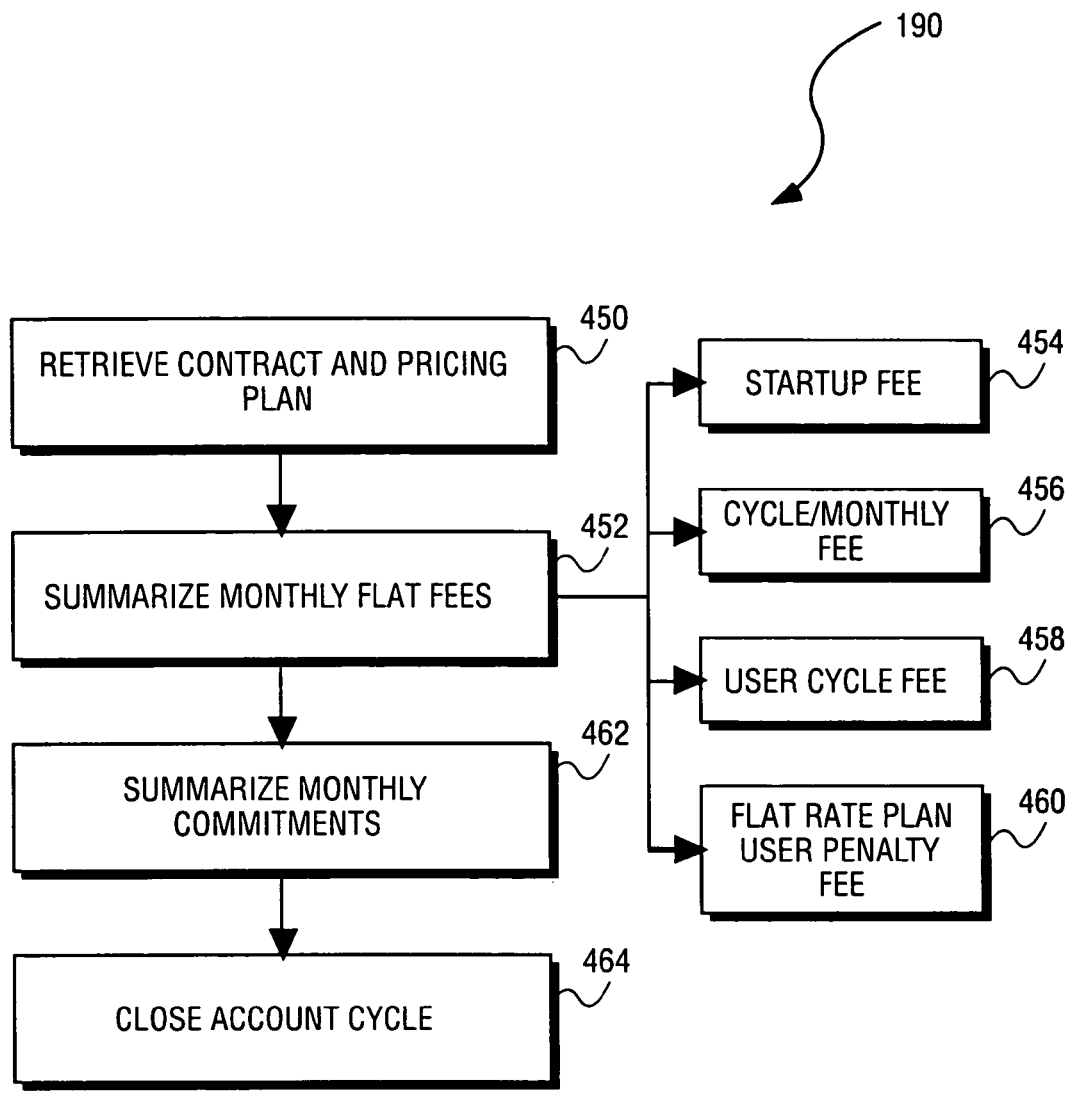
FIG. 13B is a flow chart illustrating a cycle summary process, according to an exemplary embodiment of the present invention.

FIG. 13B is a flow chart illustrating further details of a cycle summary process 190, according to an exemplary embodiment of the present invention. The cycle summary process 190 retrieves account cycles from the account cycle table 178 for a particular customer, then proceeds to block 450 and retrieves a contract and pricing plan for the specific customer from a contract table 229, based on a customer identifier, a location identifier, a reseller identifier (if any) and a product identifier.

At block 452, monthly flat fees may be summarized.

This involves the selection of all records from a flat fee table 243, included within the pricing tables 136, for a particular plan identifier associated with the relevant customer.

At block 454, if the plan includes a start-up fee, and the current cycle is the first cycle for a given customer, the start-up fee is calculated by resolving the rate identifier from the flat fee table 243 to the dollar amount, applying a fee discount from the flat fee table 243, and a reseller start-up fee discount (if any) from the contract table 229 to the fee amount. Thereafter, a billing record is inserted into a billing event table (not shown). Start-up fee and service charge balances are incremented.

At block 456, if the plan includes cycle (or monthly) fees, the cycle fee is calculated by resolving the rate identifier from the flat fee table 243 to the dollar amount and applying a fee discount from the flat fee table 243 to the fee amount. A billing record is then inserted into the billing event table (not shown) and cycle fee and service charge balances are incremented.

At block 458, if the plan includes user cycle fees, a number of end users for the cycle is calculated by calculating the number of records of the user account cycle for the relevant customer. A fee is calculated by resolving the rate identifier from the flat fee table 243 to the dollar amount, applying a fee discount from the flat fee table 243 to the fee amount, and multiplying it by the number of users, as previously calculated. A billing event record is then inserted into the billing event table (now shown), and user cycle fee and service charge balances are incremented.

At block 460, if the plan includes a flat rate plan user penalty fee, a number of end users for the cycle is calculated by calculating the number of records in the user account cycle for the relevant customer. A delta is calculated between an active amount of users and a number of users contained in the contract record. A fee is calculated by resolving a rate identifier from the flat fee table 243, applying a fee discount from the flat fee table 243 to the fee amount, and multiplying this amount by the delta, as previously calculated. A billing event record is then inserted into the billing event table (not shown) and user cycle fee and service charge balances are incremented.

If a fee contained in the flat fee table 243 is not one of the fee types discussed above, an exception is raised.

Having then summarized the monthly flat fees at block 252, the process 190 progresses to block 462, where monthly commitments are summarized. Specifically, if a contract record is determined to contain a monthly commitment, a number of operations are performed. Specifically, if the monthly commitment is specified as a dollar amount, a verification operation is performed to determine whether total usage charges for the cycle are lower than the committed amount and, if so, a commitment penalty is set to the difference between the total usage charges and the committed amount.

If the commitment is specified as time, a verification operation is performed to determine whether total usage time for the cycle is lower than the committed time period. If so, a commitment penalty is calculated as the delta between the total usage time for the cycle and the commitment time, this delta being multiplied by the commitment penalty rate contained in the contract.

A billing event record is then inserted into the billing event table (not shown), and commitment penalty and service charge balances are incremented.

At block 464, the account cycle is closed.

Returning to FIG. 10, at block 192, an invoice and CDR generation process is run after a cycle closes as part of the billing process. Specifically, at block 192, customer invoices are created billing reports are generated, and billing reports are published. It should be noted that the CDR generation at block 192 may also be performed in near real-time for customer access and viewing.

At block 194, a system audit process is performed. At block 196, a financial summary generation process is run periodically (e.g., daily) to support daily and monthly operational and finance reporting. The financial summary generation process aggregates revenue by customer or provider, time of service access transaction occurrence, time within which the service access transaction is settled, country and region called. A number of summary tables may then be generated.

At block 198, a network data aggregation process summarizes the service access transaction data to support network load reporting, which includes information on total users, total number of connections, maximum simultaneous users and average session duration by country, city, state, transaction date and hour.

At block 200, a certificate management process manages certificates for the network servers 54 and the roaming servers 52 installed at various remote sites.

Settlement Classes

Exemplary classes that implement the settlement and billing functionality described above will now be described. Exemplary settlement classes may implement the following processes:

1. Load and normalization: The loading of accounting records from network transaction servers 48 and service providers 32, the conversion of accounting data received from the various providers 32 into a single format to be used for billing, determining the parties involved in a service access transaction (a customer and a provider), defining prices that the access broker system 34 owes to a provider 32 for a given transaction (i.e., a buy price) and the price that a customer owes to the access broker system 34 (i.e., the sell price).

2. Cycle summary: The determination of start-up and monthly fees, verifying minimum monthly commitments and applicable penalties, calculating account balances and closing an accounting cycle.

3. Invoicing: The generation of invoices and call detail records (CDRs).

Figure 14A:
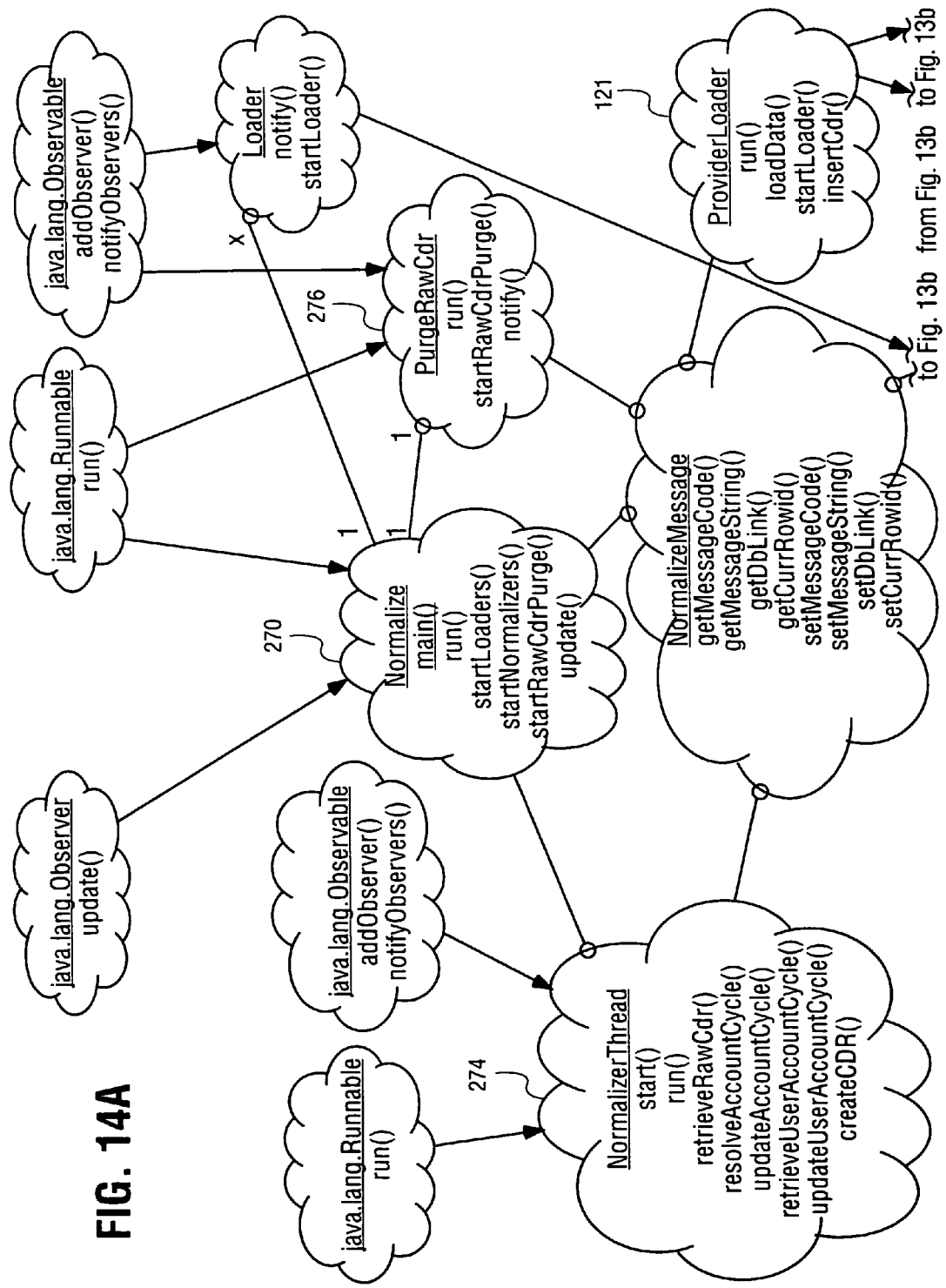
FIGS. 14A-14B are object diagrams illustrating exemplary settlement classes.
Figure 14B:
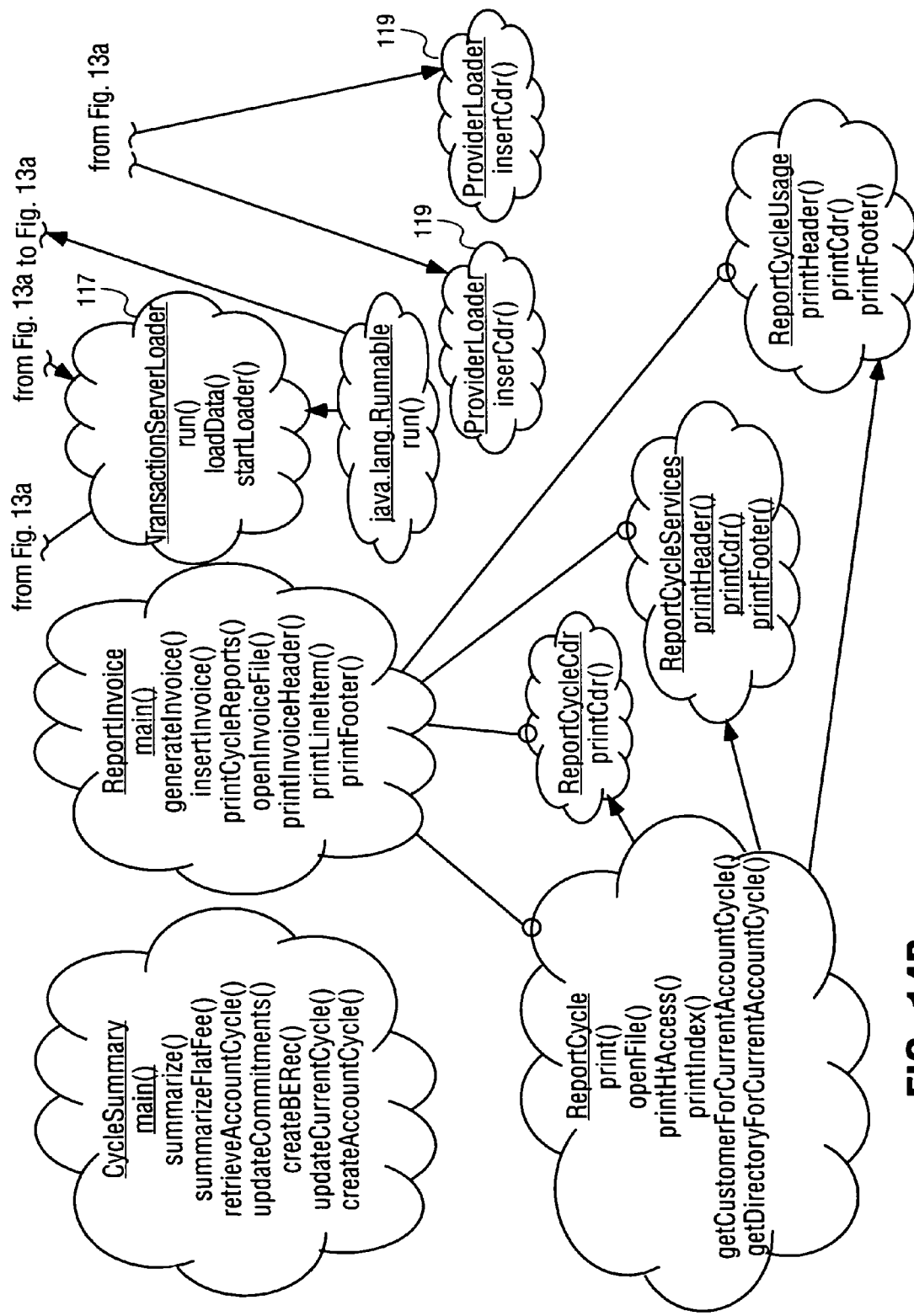
Figure 15:
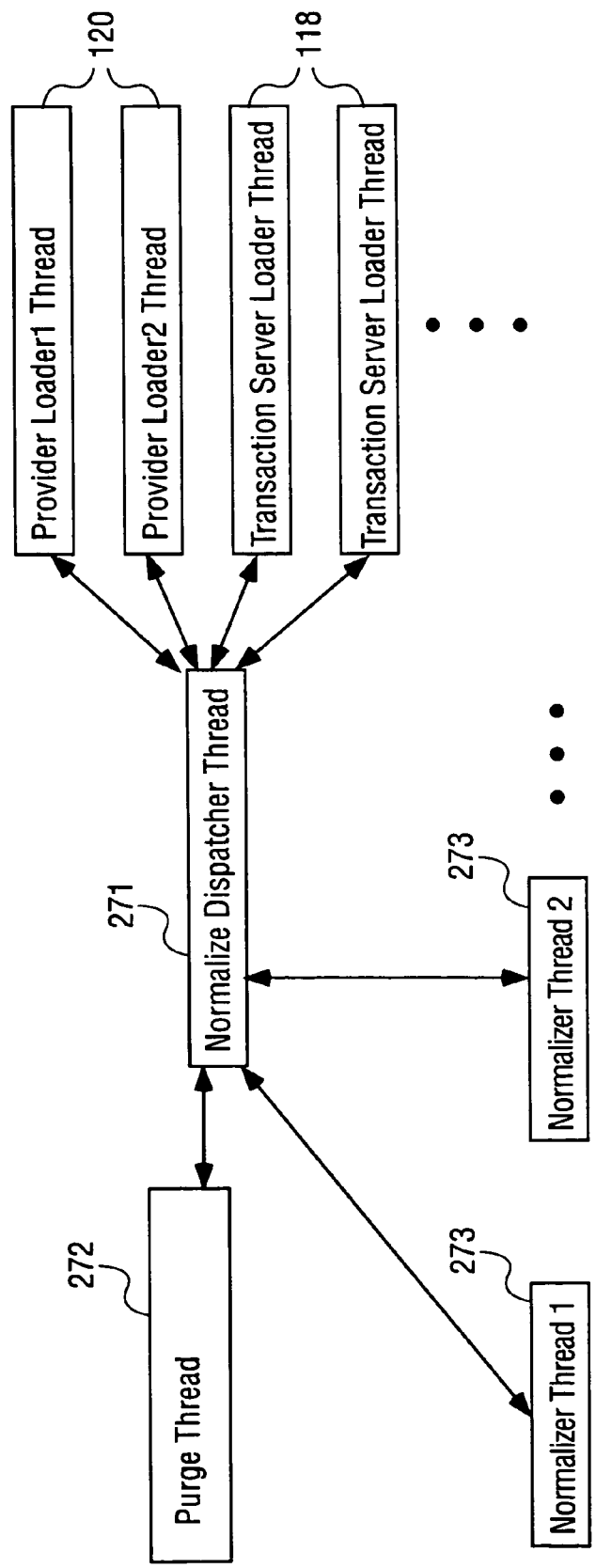
FIG. 15 is a block diagram illustrating the various exemplary threads that may be started by a normalization class.

The load, normalization and summarization processes are, in one embodiment, implemented in near real-time utilizing multi-threaded processes. Specifically, each thread makes an independent connection to a database. In one embodiment, the load and normalization processes are controlled by a "dispatcher thread" 271. FIGS. 14A-14B are object diagrams illustrating settlement classes, according to an exemplary embodiment of the present invention. In one embodiment, the dispatcher thread 271 is implemented by a normalize class 270. To this end, FIG. 15 is a block diagram illustrating various threads, according to an exemplary embodiment of the present invention, that may be started by the normalize class 270. The dispatcher thread 271 is responsible for controlling the normalization process. The normalize class 270 starts loader threads 118 and 120, as well as purge threads 272, and also polls the raw CDR table 170 for data.

As described above, and as will be apparent from FIGS. 14A, 14B and 15, the normalize class 270 starts two types of loader threads, namely transaction server loader threads 118 and provider loader threads 120.

Specifically, the transaction server loader threads 118 are implemented by a transaction server loader class 117, shown in FIG. 14B, to poll remote transaction servers 48 for raw data. It will be noted that a distinct transaction server loader thread 118 is implemented for each transaction server 48 from which raw data is obtained.

If data is available for processing at a specific transaction server 48, the respective loader thread 118 retrieves the raw data from the remote location, and loads the retrieved data into a transaction history table. The loader thread 118 loads a "STOP" accounting record in the raw CDR table 170, and notifies the normalize dispatcher thread 271 by generating an appropriate normalize message. The transaction server loader thread 118 then suspends further processing by "going to sleep" for a specified amount of time.

The provider loader threads 120 are implemented by a provider loader class 121 to poll remote provider servers (e.g., FTP servers) for data files. If data is available for processing from a specific provider, a respective provider loader thread 120 retrieves the data from the remote server via, for example, PGP. Again, a separate and dedicated provider loader thread 120 is instantiated for each service provider 32 from which data is retrieved. The loader thread 120 then loads the retrieved data into a history table, and loads a "STOP" accounting record into the raw CDR table 170, and notifies the normalize dispatcher thread 271 by generating a normalized message. A provider loader thread 120 then suspends further processing by going to sleep for a specific amount of time.

Turning specifically to the normalize dispatcher thread 271, this thread is responsible for polling the raw CDR table 170 for data. When a raw row is available for processing, the dispatcher thread 271 attempts to locate a normalizer thread (of the normalization process 172 shown in FIG. 9), to process the relevant row. If such a normalizer thread 273 is available, the normalize class 270 invokes the start ( ) method on the relevant normalizer thread 273. On the other hand, should no normalizer threads 273 be available for processing a raw record, the normalize class 270 sleeps for a predetermined time period, whereafter an attempt is again made to locate a normalizer thread 273.

The normalizer thread class 274 operates to process raw CDR records and determines parties involved in a service access transaction (i.e., the customer and the provider), defines the price that the access broker system 34 owes to the provider 32 for a specific network transaction (i.e., the buy price) and the price that the customer owes to the access broker system 34 (i.e., the sell price). The normalizer thread class 274 further creates a CDR record, two billing event records and updates account_cycle records associated with a provider 32 and a customer 36 for a specific network transaction. The normalizer thread class 274 further resets the status of a raw CDR record to "normalize" and suspends further operation until the dispatcher thread 271 sends another raw CDR record for processing.

The Purge Raw CDR class 276 invokes the purge thread 272 to prune raw CDR table 170 at predetermined intervals. Specifically, the purge thread 272 purges raw CDR records from the table 170 that are older than a predetermined threshold (e.g., two hours), and that have the status of "normalized", "filtered", "duplicate" and "exception".

Figure 16A:
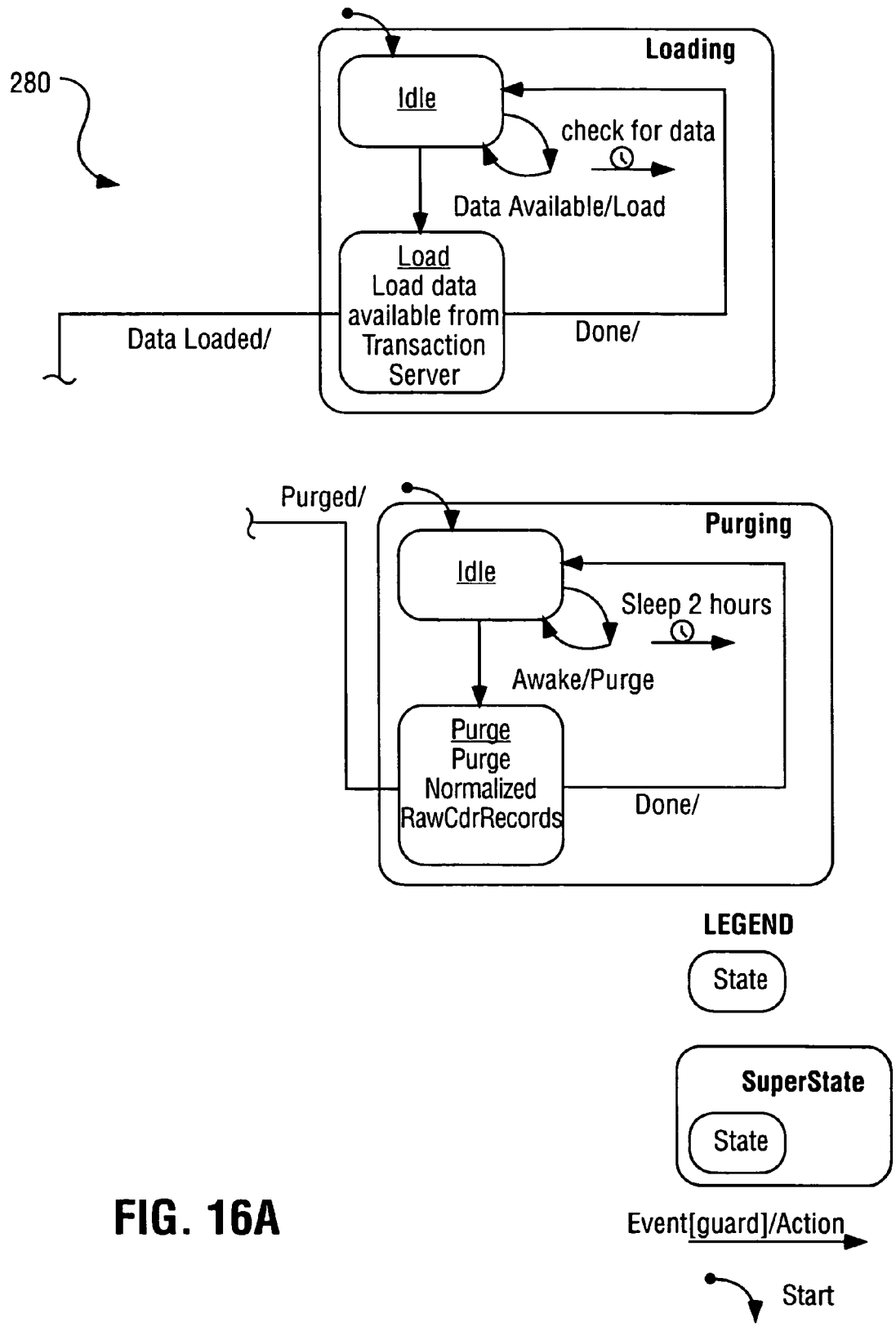
FIGS. 16A-16B illustrate a state transition diagram that describes various exemplary states of the threads illustrated in FIG. 15.
Figure 16B:
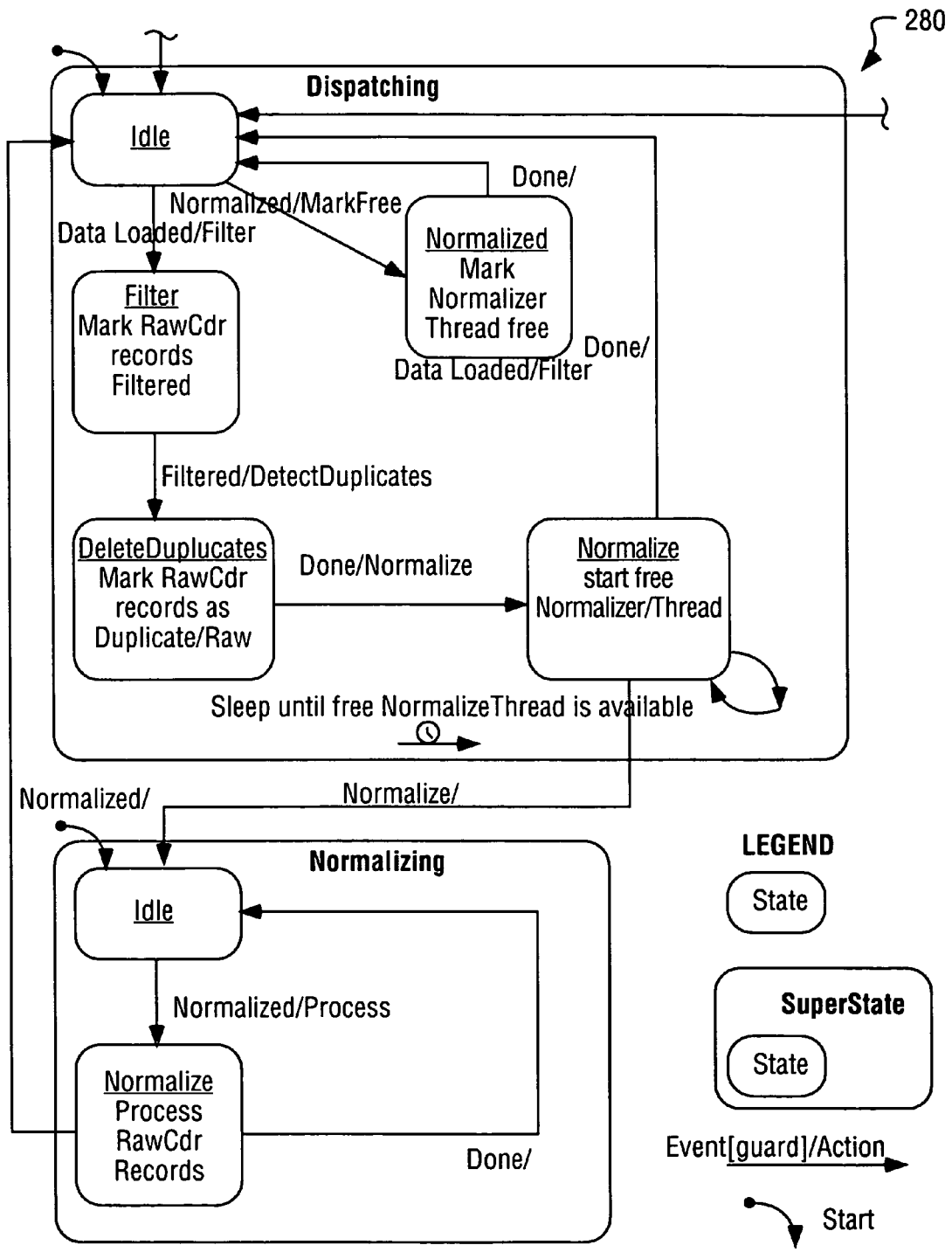

FIGS. 16A-16B illustrate a state transition diagram 280, according to an exemplary embodiment of the present invention, that describes the various states of the threads shown in FIG. 15. Specifically, FIGS. 16A and 16B show a state space of a given context, the events that cause the transition from one state to another, and the actions that result. To summarize, a loader thread 118 checks for data availability on a remote transaction server 48. If data is available for processing, the loader thread 118 downloads the data into the raw CDR table 170, and sends a "data loaded" message to the dispatcher thread 271, whereafter the loader thread 118 goes back to an idle state by suspending further operation by sleeping for a specified amount of time.

Upon receiving the "data loaded" message from the loader thread 118, the dispatcher thread 271 starts filtering the loaded records. The status of the raw CDR records that should be filtered out is changed to "filtered".

After filtering the raw CDR records, the dispatcher thread 271 detects and removes duplicates from the loaded records. The status of the duplicate raw CDR records is changed to "duplicate".

Records that are not filtered or removed as duplicate are marked as "RAW". The dispatcher thread 271 then retrieves the list of "RAW" records from the raw CDR table 170 and attempts to locate an available normalizer thread 273 for processing of each record.

In the event that the dispatcher thread 271 locates a normalizer thread 273, it sends a "normalize" message to that thread 273. If the dispatcher thread 271 cannot locate a normalizer thread 273 to process the "RAW" record, it suspends further operation by sleeping for a specific amount of time. The dispatcher thread 271 loops in the dispatching state until all "RAW" records in the raw CDR table 170 are dispatched for processing. After all the "RAW" records in the raw CDR table 170 are processed, the dispatcher thread 271 suspends further operation while sleeping for a specified amount of time.

A normalizer thread 273 receives the "normalize" message and processes the "RAW" record. The normalizer thread 273 then resets the status of the raw CDR record to "normalized" and suspends further operation until the dispatcher thread sends another raw CDR record for processing.

The purge thread 272 purges raw CDR rows older than two hours and with a status of "normalized", filtered, "duplicate", and "exception".

User Interfaces

Figure 17:
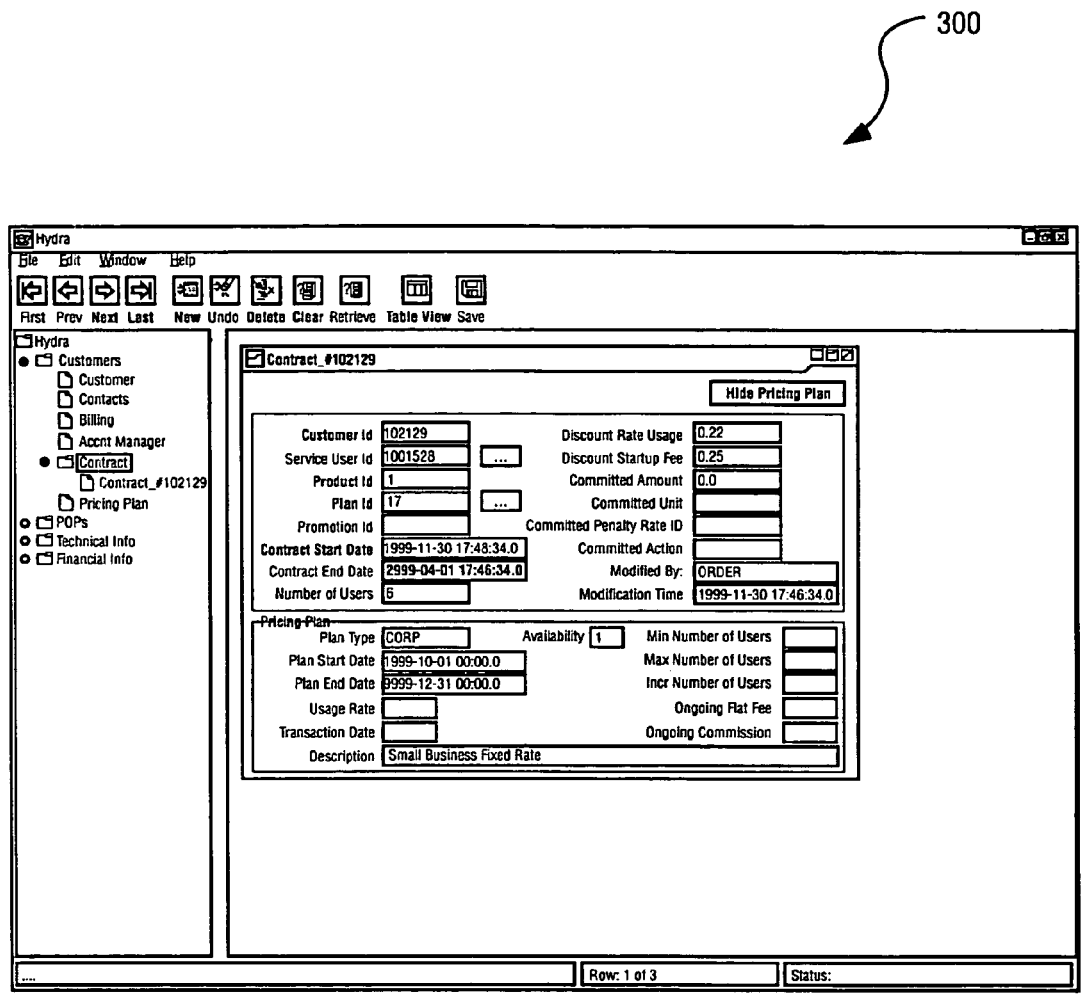
FIG. 17 is a representation of an exemplary contract screen that may be generated by a data management application.

FIG. 17 is a representation of contract screen 300, according to an exemplary embodiment of the present invention, that may be generated by the data management application 114 of the front-end applications 102, as illustrated in FIG. 6. The contract screen 300 provides pricing management functionality by facilitating access to contract, pricing, and buy rate and sell rate data. For example, utilizing the contract screen 300, internal users 88 of the access records system as illustrated in FIG. 5, may input contract specific details according to which transaction values for a service access transaction may be calculated in the manner described above. The contract screen 30 provides a convenient interface for the input of this information. Other screens that may be presented by the data management application 114 include a customer screen for receiving customer information, a technical configuration screen for receiving technical configuration information for a customer or a provider, a POP screen for maintaining access points, an account balance screen that provides access to customer account balances, end-user account balances, invoices, CDRs, billing events, payments and adjustments, a payment processing screen that allows payments to be applied by accounting personnel as they are received, an adjustment processing screen for facilitating CDR and invoice adjustments, etc.

Figure 18:
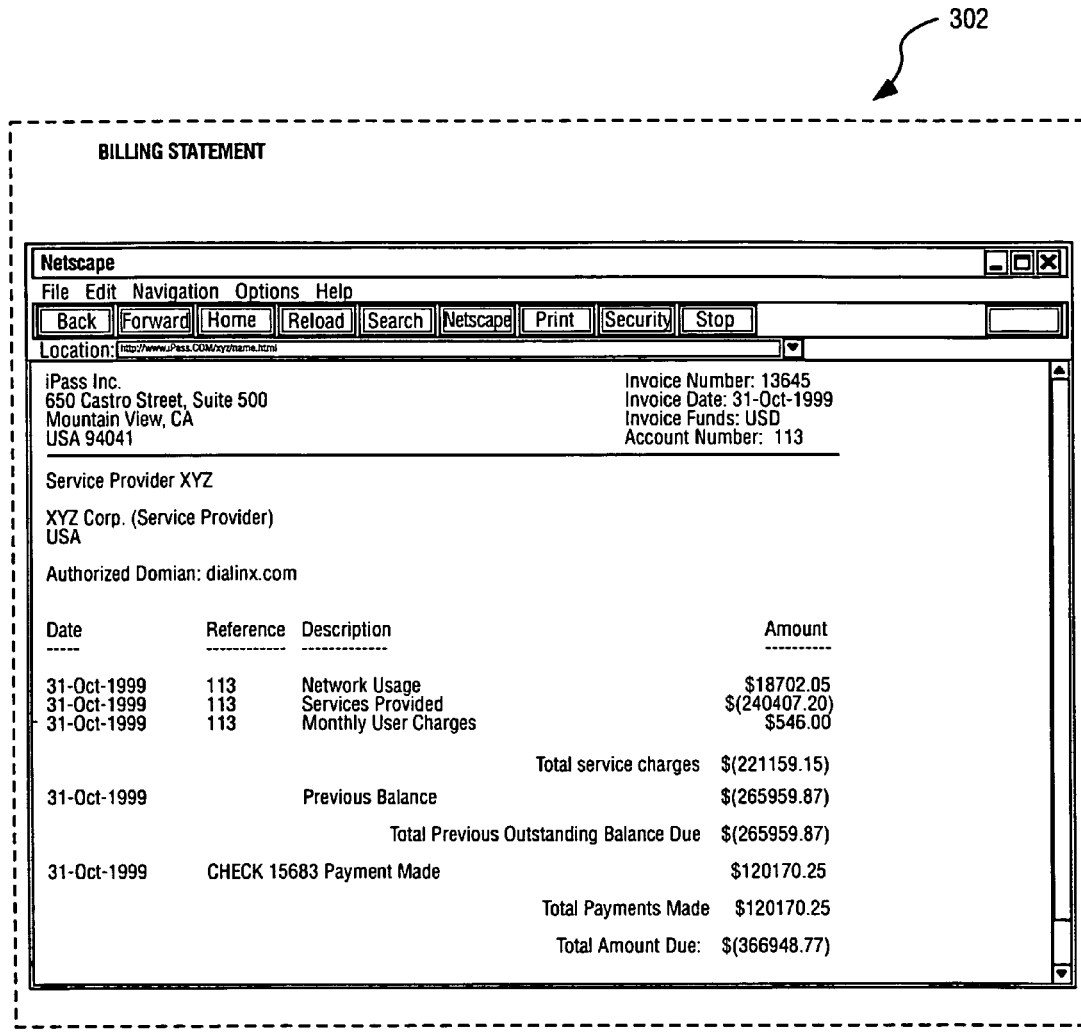
FIG. 18 illustrates an exemplary billing statement that may be generated by a settlement system.

FIG. 18 illustrates an exemplary billing statement 302 that is generated by the settlement system 53, and that may be accessed on-line by a service provider 32, or customer 36, to view the current state of an account balance. As described above, the billing statement 302 may comprise near real-time, and summarized account balance information. Specifically, where the billing statement 302 is for a service provider 32, the billing statement 302 may present an account payable balance that is automatically updated in the manner described above. Similarly, where the billing statement 302 is for a customer 36, the statement 302 will present an account receivable balance that is updated in near real-time.

Figure 19:
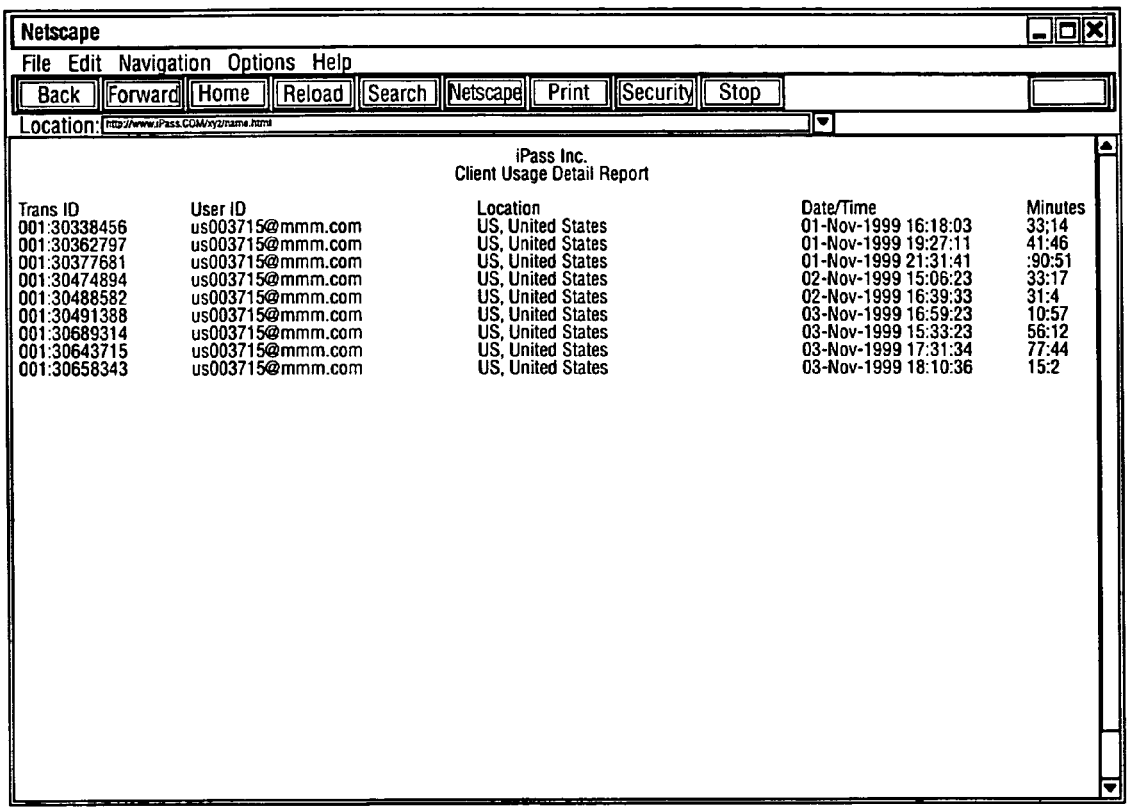
FIG. 19 illustrates an exemplary client usage report that may be generated by the access broker system.

FIG. 19 illustrates an exemplary client usage report 304 that may again be generated by the access broker system 34, for viewing by, for example, a customer 36. The customer usage report provides transaction identifier, user identifier, location, date and time information regarding all network transactions pertaining to a specific customer or provider within a predetermined time interval.

Figure 20:
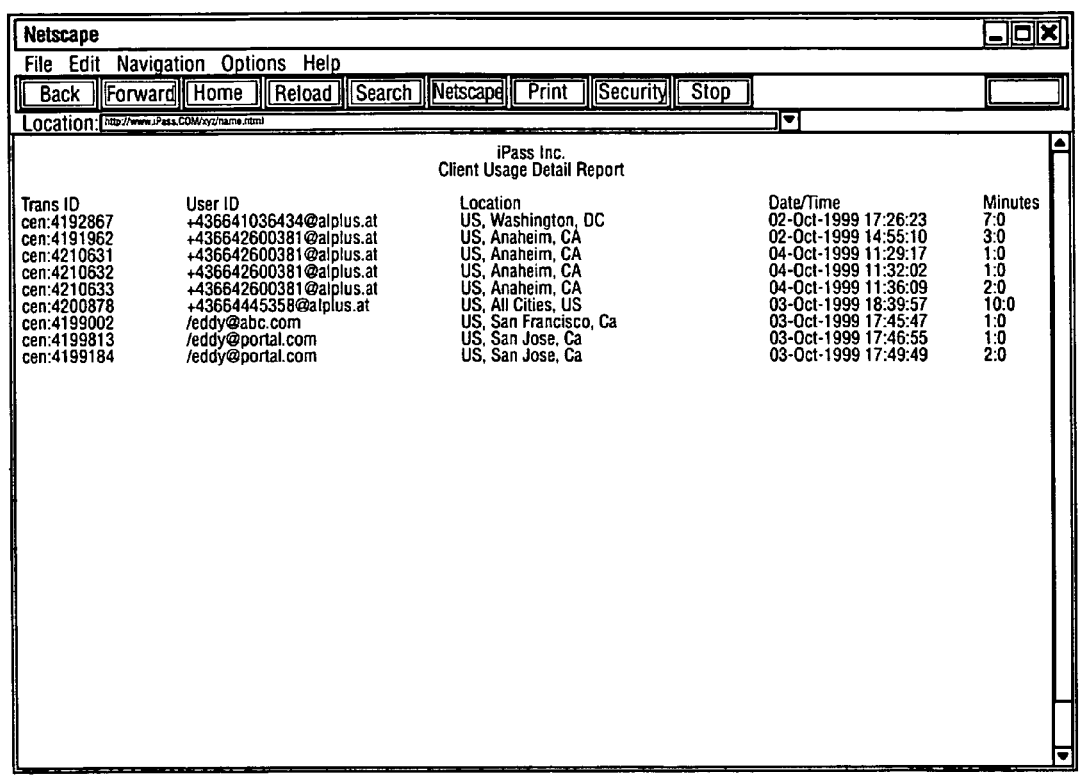
FIG. 20 illustrates an exemplary service provider report that may be automatically generated and presented to a service provider by an access broker system.

Similarly, FIG. 20 illustrates an exemplary service provider report 306 that may be automatically generated and presented to a service provider 32 by the access broker system 34 to report all service access transactions that the relevant service provider that may have facilitated. Again, a transaction identifier, user identifier, location, data and time information are specified.

Figure 21:
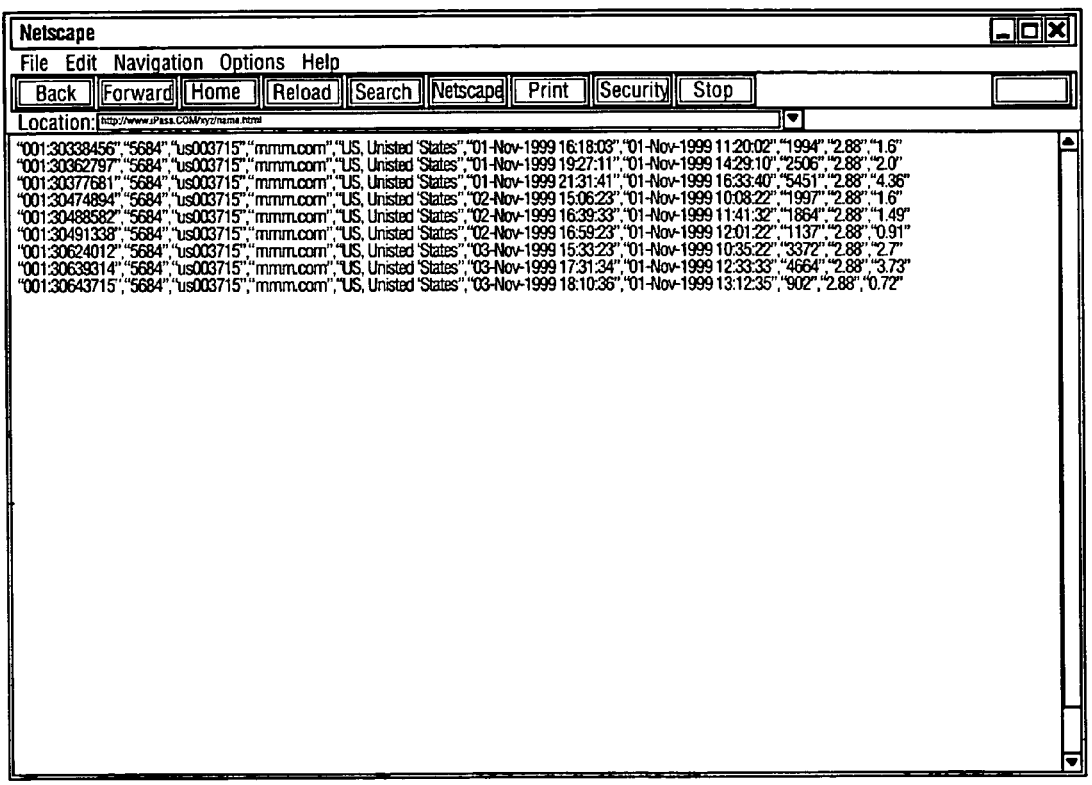
FIG. 21 illustrates an exemplary call detail report that may provide a view of CDR records in comma-delimited format.

FIG. 21 illustrates an exemplary call detail report 308, which provides a view of CDR records in comma-delimited format.

Computer System

Figure 22:
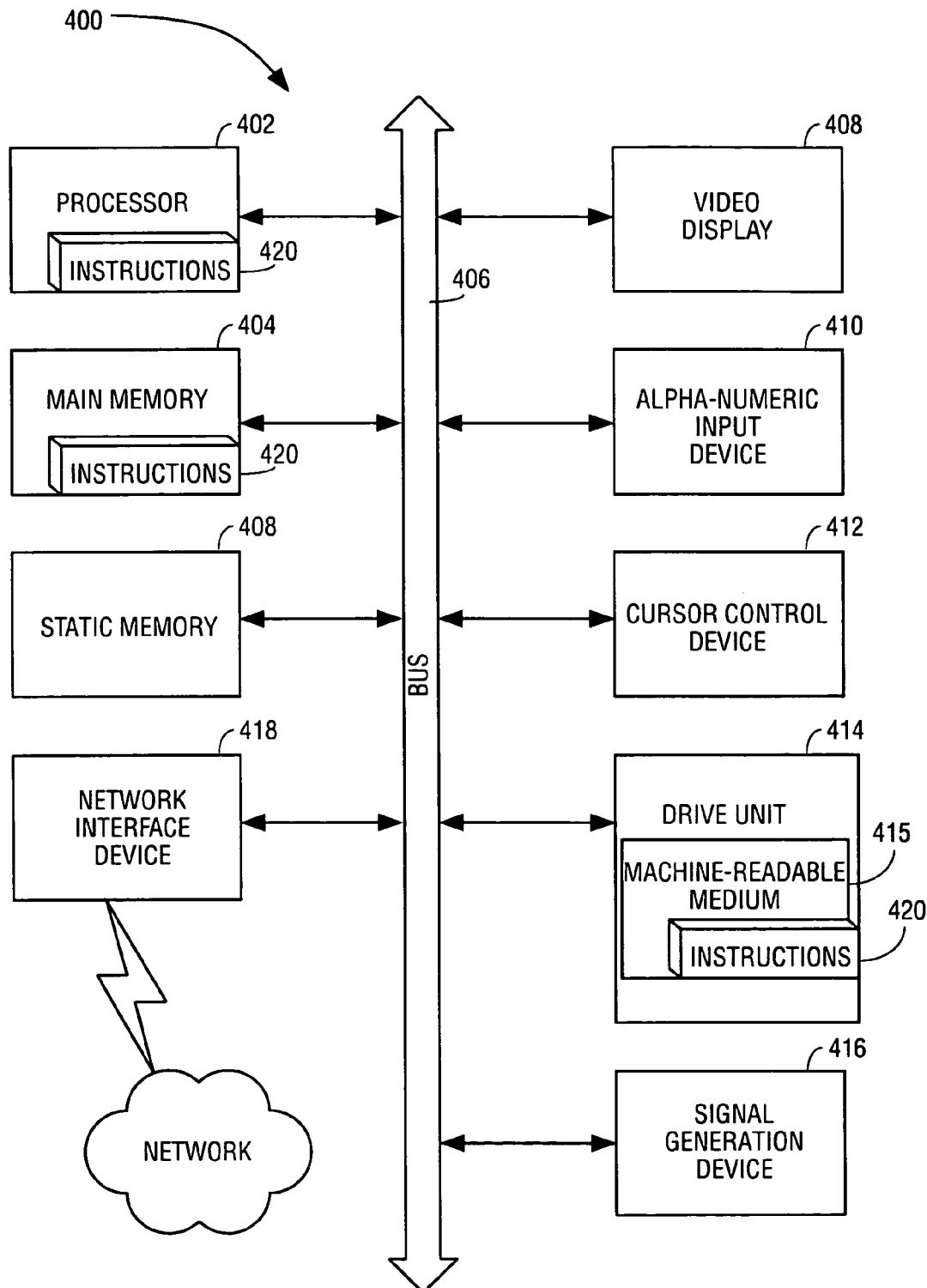
FIG. 22 is a diagrammatic representation of a machine, in the exemplary form of a computer system, within which a set of instructions to perform an exemplary embodiment of the invention may be executed.

FIG. 22 shows a diagrammatic representation of machine in the exemplary form of a computer system 400 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 310 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored a set of instructions (i.e., software) 424 embodying any one, or all, of the methodologies described above. The software 424 is also shown to reside, completely or at least partially, within the main memory 404 and/or within the processor 402. The software 424 may further be transmitted or received via the network interface device 420. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system to facilitate financial settlement of service access transactions between multiple parties have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method to facilitate roaming between a plurality of network service providers, the method comprising:

intercepting, in a first group of network service providers, authorization requests for accessing a network via the first group of network service providers, wherein the authorization requests are associated with service customers subscribed to ones of a second group of network service providers, wherein the authorization requests are not acceptable to the first group of network service providers;

transmitting, from the first group of network service providers, the authorization requests to the second group of network service providers;

receiving, in the first group of network service providers, authorization messages from the second group of network service providers, wherein the authorization messages cause the first group of network service providers to allow the service customers to access the network;

transmitting, from the first group of service providers to an access broker system, accounting information indicating time durations of the accesses to the network, wherein the accounting information is associated with the service customers and with the first and second groups of network service providers;

determining, in the access broker system, prices for allowing the service customers to access the network, wherein the determining includes, determining, based on the accounting information, identities for each of the service customers, and location identifiers for each of the first group of network service providers;

determining pricing plans based on the identities and the location identifiers;

determining the prices based on the time durations and the pricing plans;

updating, in the access broker system, account payable balances and account receivable balances for the service customers and for the first and second groups network service providers, the updating based on the prices.

2. The method of claim 1, wherein the service customers include any one of a group of customers including a business, an end-user, an Internet carrier, a Value-Added Reseller (VAR) and a channel.

3. The method of claim 1, wherein the service customers access the network utilizing access points provided by the first group of network service providers.

4. The method of claim 1, wherein the prices include buy prices owed by a service broker to the first group of network service providers and sell prices owed by the service customers to the service broker.

5. The method of claim 1 further comprising verifying credit limits for the account receivable balances associated with the service customers.

6. A financial settlement system to settle service access transactions between multiple parties, the system comprising:

a network server configured to intercept an authorization request being transmitted from a service customer of a plurality of service customers to a first network service provider of a plurality of network service providers, wherein the service customer is subscribed to a second network service provider of the plurality of network service providers, and wherein the first network service provider will not allow network access based on the authorization request;

a transaction server configured to receive the authorization request from the network server, to transmit the authorization request to the second network service provider, to receive an authorization message from the second network service provider, and to transmit the authorization message to the first network service provider, the authorization message indicating the service customer is permitted to access the network;

a loader application configured to collect data concerning a transaction performed by the service customer, the transaction pertaining to the network access; and a settlement application configured to determine a transaction value for the transaction based on pricing models associated with a multi-tiered grouping of customers that includes the plurality of service customers and the plurality of network service providers, and to update an account payable balance for the service customer and one or more account receivable balances for one or more of the plurality of network service providers, the updating based at least in part on the transaction value.

7. The system of claim 6, wherein the transaction value includes a transaction rate and a transaction price.

8. The system of claim 6 wherein the plurality of service customers includes any one of a group of customers including a business, an end-user, an Internet carrier, a Value-Added Reseller (VAR), and a channel.

9. The system of claim 6 wherein the first and second network service providers each support roaming service access, and wherein the service customer achieves the access to the network via an access point provided by the first network service provider.

10. The system of claim 6, wherein the settlement application is further configured to identify the first and second service providers and the service customer for the transaction.

11. The system of claim 10, wherein the settlement application is further to determine, based on information derived from the authorization request and the authorization message, a buy price owed by a service broker to the first network service provider for the transaction and a sell price owed by the first service customer to the service broker for the transaction.

12. The system of claim 11, wherein the transaction value is further based on the buy price.

13. The system of claim 11, wherein the transaction value is further based on the sell price.

14. The system of claim 6, wherein the settlement application is further configured to verify a credit limit for the service customer based on the account receivable balance of the service customer.

15. The system of claim 6, wherein the multi-tiered grouping of customers defines pricing models for the service customer, the first network service provider, and the second network service provider.

16. The system of claim 15 wherein the pricing models define the transaction value based on usage prices and transaction prices.

17. The system of claim 6, wherein the pricing models determine the transaction value based on one or more of an identity of one of the plurality of network service providers that facilitates the network access, a network access location, a service or product type, a network access type, a network access time of day, and a network access day of week.

18. The system of claim 6 wherein the settlement application is to calculate a first sell price for at least a first customer of a multi-tiered grouping of customers by applying anyone of a group of pricing models in the calculation of the first sell price including a usage rate, a transaction rate, a subscription rate, a flat rate, a discount, a promotion, a fee and a commitment.

19. A system to settle service access transactions between multiple parties, the system comprising:

means for intercepting, in a first group of network service providers, authorization requests for accessing a network via the first group of network service providers, wherein the authorization requests are associated with service customers subscribed to ones of a second group of network service providers;

means for transmitting, from the first group of network service providers, the authorization requests to the second group of network service providers;

means for receiving, in the first group of network service providers, authorization messages from the second group of network service providers, wherein the authorization messages cause the first group of network service providers to allow the service customers to access the network;

means for transmitting, from the first group of service providers to an access broker system, accounting information indicating time durations of the accesses to the network, wherein the accounting information is associated with the service customers and with the first and second groups of network service providers;

means for determining, in the access broker system, prices for allowing the service customers to access the network, wherein the means for determining include, means for determining, based on the accounting information, identities for each of the service customers, and location identifiers for each of the first group of network service providers;

means for determining pricing plans based on the identities, the location identifiers;

means for determining the prices based on the time durations and the pricing plans;

means for updating, in the access broker system, account payable balances and account receivable balances for the service customers and for the first and second groups of network service providers, the updating based on the transaction value.

20. The system of claim 19, wherein the service customers include any one of a group of customers including a business, an end-user, an Internet carrier, a Value-Added Reseller (VAR) and a channel.

21. The system of claim 19 further comprising: means for verifying credit limits for the account receivable balances associated with the service customers.

* * * * *